(12) United States Patent
Capoglu et al.

(10) Patent No.: US 11,054,899 B2
(45) Date of Patent: Jul. 6, 2021

(54) INTERACTIVE VIRTUAL REALITY MANIPULATION OF DOWNHOLE DATA

(71) Applicant: HALLIBURTON ENERGY SERVICES, INC., Houston, TX (US)

(72) Inventors: Ilker R. Capoglu, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/609,267

(22) PCT Filed: Jun. 28, 2017

(86) PCT No.: PCT/US2017/039779
§ 371 (c)(1),
(2) Date: Oct. 29, 2019

(87) PCT Pub. No.: WO2019/005045
PCT Pub. Date: Jan. 3, 2019

(65) Prior Publication Data
US 2020/0192467 A1 Jun. 18, 2020

(51) Int. Cl.
*G06F 3/01* (2006.01)
*E21B 41/00* (2006.01)
(Continued)

(52) U.S. Cl.
CPC .......... *G06F 3/012* (2013.01); *E21B 41/0092* (2013.01); *E21B 47/00* (2013.01);
(Continued)

(58) Field of Classification Search
CPC .......... E21B 44/00; E21B 47/00; E21B 49/00; E21B 41/0092; E21B 47/002;
(Continued)

(56) References Cited

U.S. PATENT DOCUMENTS 6,937,938 B2     8/2005  Sansone
8,830,232 B2 *   9/2014  Rothnemer ............. G06T 17/05
                                                   345/419

(Continued)

FOREIGN PATENT DOCUMENTS

CN          105814610 A       7/2016

OTHER PUBLICATIONS

International Search Report and Written Opinion; PCT/US2017/039779; dated Mar. 27, 2018.
(Continued)

*Primary Examiner* — Vinh T Lam
(74) *Attorney, Agent, or Firm* — Polsinelli PC

(57) ABSTRACT

A method for three dimensional visualization and manipulation of downhole data. A measured signal is received a downhole environment and a three dimensional virtualization of the measured signal is generated. A stereographic viewer displays the three dimensional virtualization of the measured signal. The three dimensional virtualization can be manipulated in response to an input from a user, thereby creating a manipulated three dimensional virtualization. The stereographic viewer can display the manipulated three dimensional virtualization.

14 Claims, 21 Drawing Sheets

(51) Int. Cl.
  *E21B 47/00* (2012.01)
  *E21B 49/00* (2006.01)
  *G06T 19/00* (2011.01)
  *E21B 47/002* (2012.01)

(52) U.S. Cl.
  CPC ............ *E21B 47/002* (2020.05); *E21B 49/00* (2013.01); *G06F 3/017* (2013.01); *G06T 19/00* (2013.01)

(58) Field of Classification Search
  CPC .... H04N 13/117; H04N 13/344; G06F 3/012; G06F 3/014; G06F 3/017; G06F 3/0346; G06F 3/013; G06F 3/011; G06F 3/04815; G06T 19/00
  See application file for complete search history.

(56) References Cited

U.S. PATENT DOCUMENTS

| | | | | |
|---|---|---|---|---|
| 8,972,897 | B2* | 3/2015 | McNeill | G06F 3/011 715/848 |
| 9,638,022 | B2* | 5/2017 | Bittar | G01V 1/34 |
| 9,928,661 | B1* | 3/2018 | Kinstner | A63F 13/20 |
| 10,168,768 | B1* | 1/2019 | Kinstner | G06F 3/011 |
| 10,489,931 | B1* | 11/2019 | Kinstner | G06F 3/04815 |
| 2004/0204855 | A1* | 10/2004 | Fleury | E21B 47/002 702/6 |
| 2005/0216197 | A1* | 9/2005 | Zamora | G01V 1/34 702/6 |
| 2006/0293872 | A1 | 12/2006 | Zamora et al. | |
| 2011/0175899 | A1* | 7/2011 | Bittar | G06T 19/00 345/419 |
| 2011/0234584 | A1 | 9/2011 | Endo | |
| 2012/0147006 | A1* | 6/2012 | Rothnemer | G06T 17/05 345/424 |
| 2012/0169841 | A1 | 7/2012 | Chemali et al. | |
| 2013/0275100 | A1 | 10/2013 | Ellis et al. | |
| 2014/0118334 | A1* | 5/2014 | Guijt | G06T 11/206 345/419 |
| 2014/0152659 | A1* | 6/2014 | Davidson | G06T 17/05 345/420 |
| 2015/0226004 | A1 | 8/2015 | Thompson | |
| 2017/0243400 | A1* | 8/2017 | Skidmore | G06F 3/04842 |
| 2018/0266245 | A1* | 9/2018 | Gillan | E21B 47/022 |
| 2019/0018165 | A1* | 1/2019 | McManamon | E21B 47/11 |
| 2019/0258058 | A1* | 8/2019 | Fortin-Desch nes | G06F 3/011 |
| 2020/0120322 | A1* | 4/2020 | Ogasawara | H04N 13/167 |

OTHER PUBLICATIONS

English Abstract of CN105814610 retrieved from www.espacenet.com on Oct. 17, 2019.

* cited by examiner

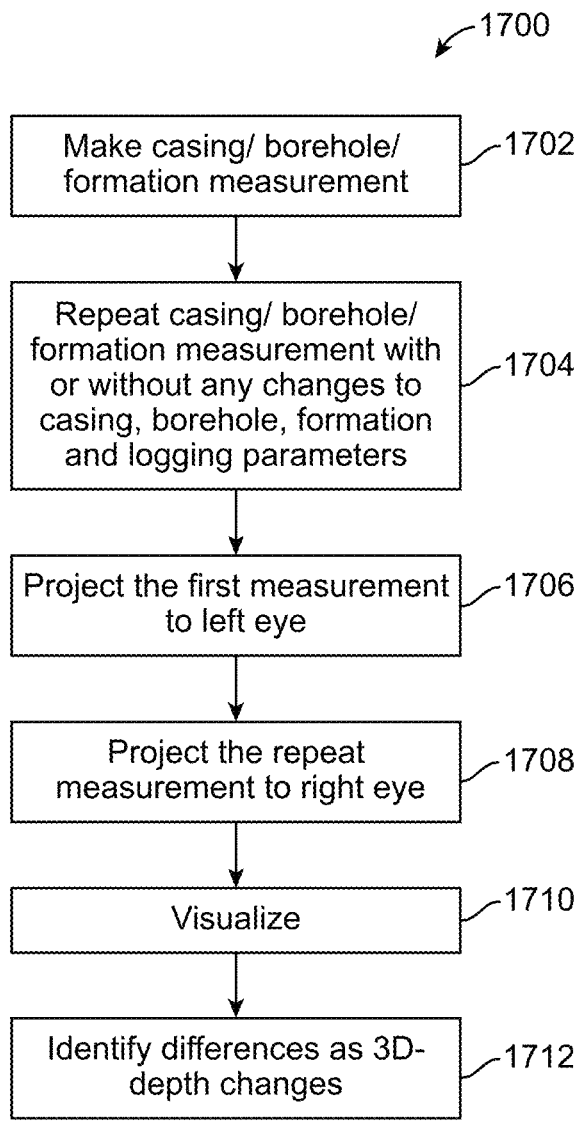
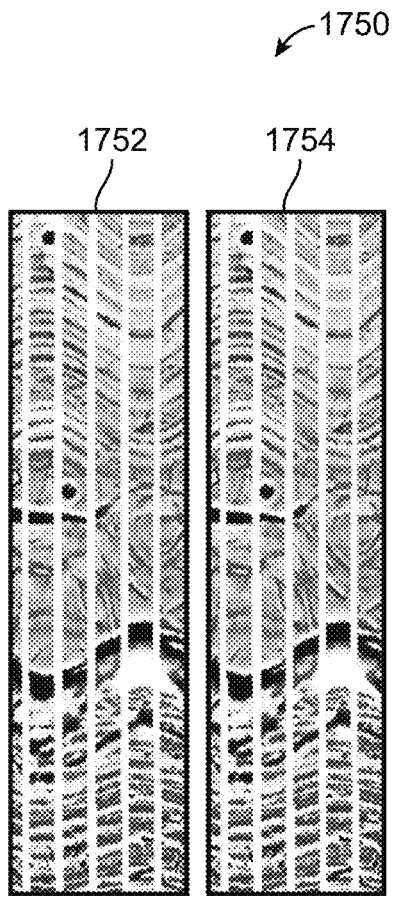
FIG. 17A
FIG. 17B

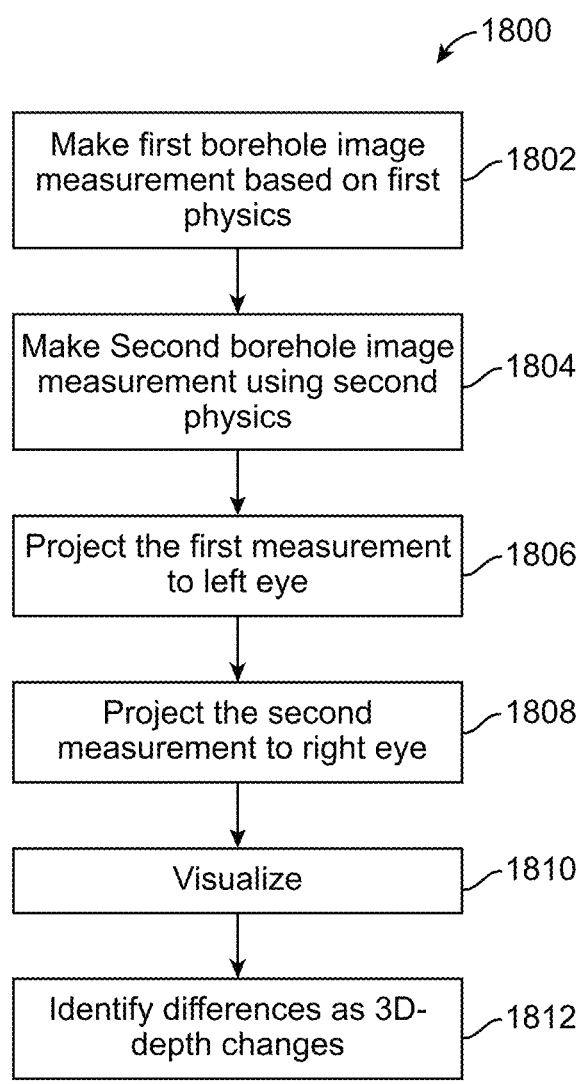
FIG. 18A
FIG. 18B

INTERACTIVE VIRTUAL REALITY MANIPULATION OF DOWNHOLE DATA

CROSS-REFERENCE TO RELATED APPLICATIONS

This application is a national stage entry of PCT/US2017/039779 filed Jun. 28, 2017, said application is expressly incorporated herein in its entirety.

FIELD

The subject matter herein generally relates to a system and method for manipulating data using an interactive virtual reality device, and in particular, visualizing and manipulating data obtained in a downhole environment.

BACKGROUND

Visualization of downhole data has been limited to representation on a two dimensional display, or a three dimensional display lacking interactivity. Two dimensional display prevents a user from actively visualizing the downhole data as it exists within a formation or wellbore. A three dimensional display provides visualization, but prevents manipulation of the downhole data and/or adjustment of wellbore operations in response to the three dimensional display.

BRIEF DESCRIPTION OF THE DRAWINGS

FIG. 17A is a flow chart of an interactive three dimensional virtual reality system for comparing downhole measurements;

FIG. 17B is a diagrammatic view of comparing downhole measurements;

FIG. 18A is a flow chart of an interactive three dimensional virtual reality system for comparing downhole measurements from different tools; and FIG. 18B is a diagrammatic view of comparing downhole measurements from different tools;

DETAILED DESCRIPTION

Figure 1A:
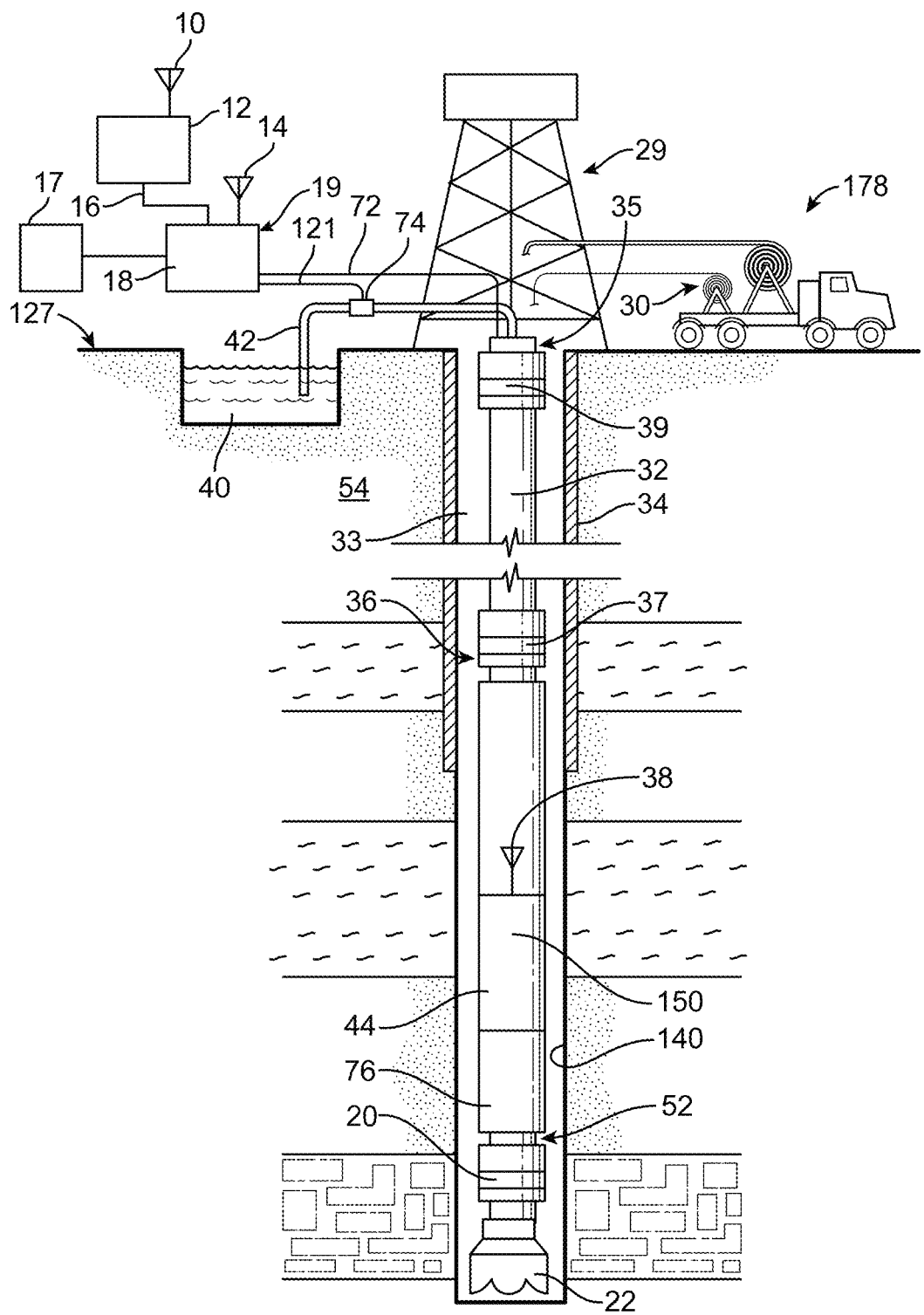
FIG. 1A is a diagrammatic of an embodiment of a wellbore drilling operation from which downhole data can be obtained for use with an interactive virtual reality system and method, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Unless otherwise specified, any use of any form of the term "couple," or any other term describing an interaction between elements is not meant to limit the interaction to direct interaction between the elements and also may include indirect interaction between the elements described.

The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "parallax" as described herein means a displacement or difference in the apparent position of an object viewed along two lines of sign, and is measured by the angle or semi-angle of inclination between two lines.

The present disclosure is drawn to an interactive virtual reality system and related method for controlling and manipulating downhole data and operations using the interactive virtual reality system. The interactive virtual reality system for visualization and manipulation of downhole data can include an interactive virtual reality apparatus having a stereographic display device and a gesture control device, and an electronic device communicatively coupled with the interactive virtual reality apparatus. The electronic device can have a processor and/or memory, and the memory can store instructions, which when executed can cause the processor to receive a measured signal of a downhole environment, generate a three dimensional virtualization of the measured signal, communicate the three dimensional virtualization to the interactive virtual reality apparatus, manipulate the three dimensional virtualization in response to an input from the interactive virtual reality apparatus, thereby creating a manipulated three dimensional virtualization, and communicate the manipulated three dimensional virtualization to the interactive virtual reality apparatus. The measured signal can be one of a voltage, a current, an impedance, a formation property, a casing property, a casing defect, a temperature, a pressure, a chemical composition, a distance to water, a distance to carbon dioxide, a distance to a bed boundary (DTBB), a caliper measurement, and/or a resistivity function of space, time, or space and time.

FIG. 1A illustrates a wellbore operating environment having a well logging apparatus 150. The well logging apparatus 150 can conduct well logging during drilling operations in a subterranean well environment. A wellbore 48 is shown that has been drilled into the earth 54 from the ground's surface 127 using a drill bit 22. The drill bit 22 is located at the bottom, distal end of the drill string 32 and the bit 22 and drill string 32 are being advanced into the earth 54 by the drilling rig 29. The drilling rig 29 can be supported directly on land as shown or on an intermediate platform if at sea. For illustrative purposes, the top portion of the wellbore includes casing 34 that is typically at least partially made up of cement and which defines and stabilizes the wellbore after being drilled. The drill bit 22 can be rotated via rotating the drill string, and/or a downhole motor near the drill bit 22.

As shown in FIG. 1A, the drill string 32 supports several components along its length, including a well logging apparatus 150. A sensor sub-unit 52 is shown for detecting conditions near the drill bit 22, conditions which can include such properties as formation fluid density, temperature and pressure, and azimuthal orientation of the drill bit 22 or string 32. Measurement while drilling (MWD)/logging while drilling (LWD) procedures are supported both structurally and communicatively. The instance of directional drilling is illustrated in FIG. 1A. The lower end portion of the drill string 32 can include a drill collar proximate to the drilling bit 22 and a drilling device such as a rotary steerable drilling device 20, or other drilling devices disclosed herein. The drill bit 22 may take the form of a roller cone bit or fixed cutter bit or any other type of bit known in the art. The sensor sub-unit 52 is located in or proximate to the rotary steerable drilling device 20 and advantageously detects the azimuthal orientation of the rotary steerable drilling device 20. Other sensor sub-units 35, 36 are shown within the cased portion of the well which can be enabled to sense nearby characteristics and conditions of the drill string, formation fluid, casing and surrounding formation. Regardless of which conditions or characteristics are sensed, data indicative of those conditions and characteristics is either recorded downhole, for instance at the processor 44 for later download, or communicated to the surface either by wire using repeaters 37, 39 up to surface wire 72, or wirelessly or otherwise. If wirelessly, the downhole transceiver (antenna) 38 can be utilized to send data to a local processor 18, via topside transceiver (antenna) 14. There the data may be either processed or further transmitted along to a remote processor 12 via wire 16 or wirelessly via antennae 14 and 10.

Figure 1B:
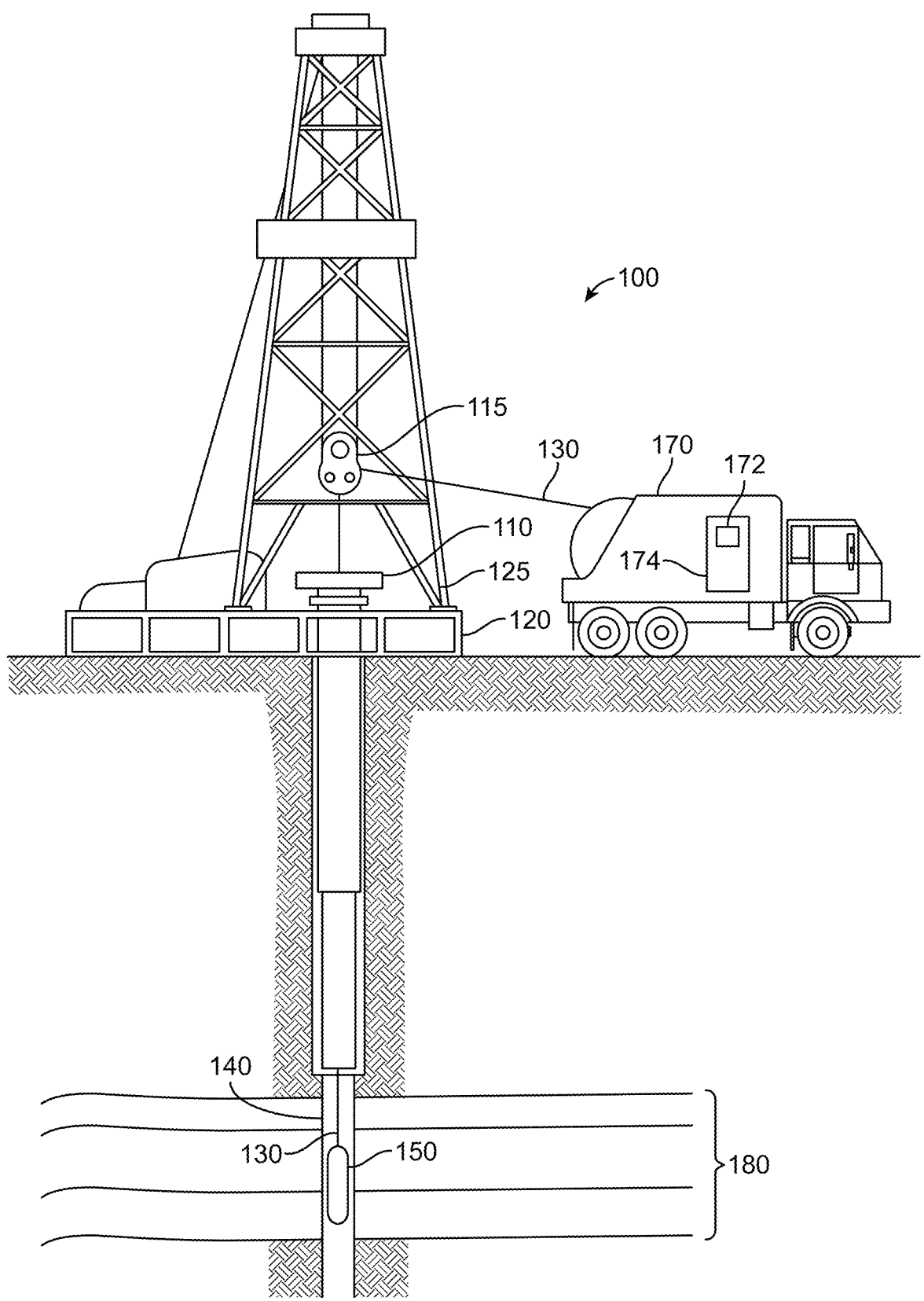
FIG. 1B is a diagrammatic of an embodiment of a wellbore operating environment from which downhole data can be obtained for use with an interactive virtual reality system and method, according to an exemplary embodiment.

Coiled tubing 178 and/or wireline 30 can be deployed as an independent service upon removal of the drill string 32 (shown for example in FIG. 1B). The possibility of an additional mode of communication is contemplated using drilling mud 40 that is pumped via conduit 42 to a downhole mud motor 76. The drilling mud is circulated down through the drill string 32 and up the annulus 33 around the drill string 32 to cool the drill bit 22 and remove cuttings from the wellbore 48. For purposes of communication, resistance to the incoming flow of mud can be modulated downhole to send backpressure pulses up to the surface for detection at sensor 74, and from which representative data is sent along communication channel 121 (wired or wirelessly) to one or more processors 18, 12 for recordation and/or processing.

The sensor sub-unit 52 is located along the drill string 32 above the drill bit 22. The sensor sub-unit 36 is shown in FIG. 1A positioned above the mud motor 76 that rotates the drill bit 22. Additional sensor sub-units 35, 36 can be included as desired in the drill string 32. The sub-unit 52 positioned below the motor 76 communicates with the sub-unit 36 in order to relay information to the surface 127.

A surface installation 19 is shown that sends and receives data to and from the well. The surface installation 19 can exemplarily include a local processor 18 that can optionally communicate with one or more remote processors 12, 17 by wire 16 or wirelessly using transceivers 10, 14.

The exemplary rotary steerable drilling device 20 schematically shown in FIG. 1A can also be referred to as a drilling direction control device or system. As shown, the rotary drilling device 20 is positioned on the drill string 32 with drill bit 22. However, one of skill in the art will recognize that the positioning of the rotary steerable drilling device 20 on the drill string 22 and relative to other components on the drill string 22 may be modified while remaining within the scope of the present disclosure.

FIG. 1B illustrates a wellbore operating environment in which the well logging apparatus, method, and system can be deployed, according to an exemplary embodiment of the present disclosure. As depicted, the operating environment 100 includes a drilling platform 120 equipped with a derrick 125 that supports a hoist 115. Drilling oil and gas wells is commonly carried out using a string of drill pipes connected together so as to form a drilling string that is lowered through a rotary table 110 into a wellbore or borehole 140.

Here it is assumed that the drill string has been temporarily removed from the wellbore 140 to allow the well logging apparatus 150 to be lowered into the wellbore 140. The well logging apparatus 150 may include one or more sensors, receivers and/or transmitters for conducting logging and measuring operations as disclosed herein. The well logging apparatus 150 can be conveyed in the wellbore 140 by any conveyance 130 including, but not limited to, wireline, logging cable, slickline, tubing, coiled tubing, pipe, metallic wire, non-metallic wire, composite wire, or downhole tractor. The well logging apparatus 150 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. Typically, the well logging apparatus 150 is lowered to the bottom of the region of interest and subsequently pulled upward at a substantially constant speed. During the upward trip, one or more sensors in the well logging apparatus 150 may be used to perform measurements on the subsurface formations 180 adjacent to the wellbore 140 as they pass by. However, measurements can be performed on both downward and upward movements of the well logging apparatus 150.

The measurement data can be communicated to a logging facility 170 for storage, processing, and analysis. The logging facility 170 may be provided with electronic equipment for various types of signal processing. For example, the logging facility 170 may include one or more well logging data processing units 174 for the processing of well logging data. In some cases, the well logging data processing unit 174 can be communicatively coupled to one or more displays 172, including an interactive virtual reality apparatus as described below with respect to FIG. 2.

In some cases, the well logging data apparatus 150 can be housed in a downhole tool body comprising additional downhole logging tools. In some cases, the logging facility 170 may store, process, and/or analyze logging data from more than one downhole logging tools.

Although FIGS. 1A and 1B depict a vertical wellbore 136, the present disclosure is equally well-suited for use in wellbores having other orientations including horizontal wellbores, slanted wellbores, multilateral wellbores or the like. Also, even though FIGS. 1A and 1B depict an onshore operation, the present disclosure is equally well-suited for use in offshore operations.

Although FIG. 1B shows an exemplary environment relating to well logging in the absence or temporary cessation of drilling operations, the present disclosure is equally well-suited for use in "logging while drilling" (LWD) operations, for example, as shown in FIG. 1A. As such, the present disclosure is equally well-suited for use in operations where the drilling assembly includes the well logging apparatus thereby providing for well data acquisition during drilling operations, when measurements may be less affected by fluid invasion.

While FIGS. 1A and 1B depict an onshore drilling rig, the present disclosure is equally well-suited to use in offshore drilling operations. Offshore oil rigs that can be used in accordance with the present disclosure include, for example, floaters, fixed platforms, gravity-based structures, drillships, semi-submersible platform, jack-up drilling rigs, tension-leg platforms, and the like. The present disclosure is suited for use in rigs ranging anywhere from small in size and portable, to bulky and permanent.

Figure 2:
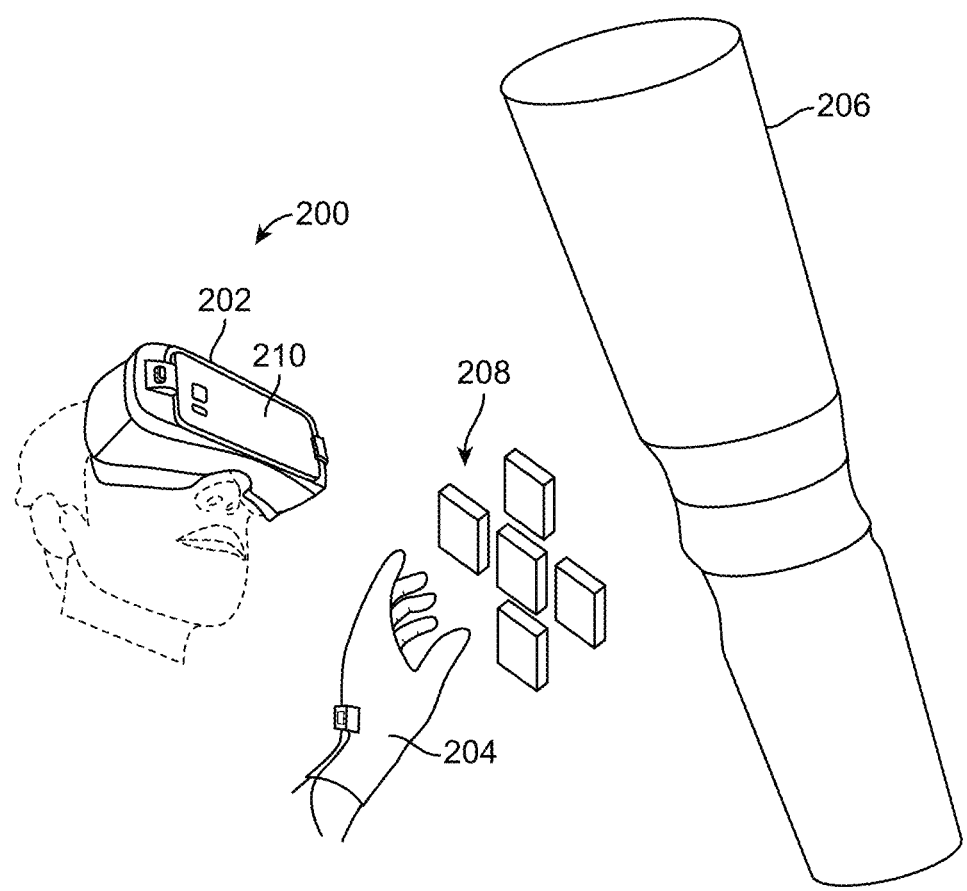
FIG. 2 is diagrammatic view of an interactive three dimensional virtual reality system for downhole data manipulation.

FIG. 2 illustrates an interactive virtual reality apparatus 200 according to the present disclosure. The interactive virtual reality apparatus 200 can be implemented during a MWD/LWD or other logging operation as described above with respect to FIGS. 1A and 1B or can be implemented with data obtained from operations described above with respect to FIGS. 1A and 1B. The interactive virtual reality apparatus 200 can include a stereographic display device 202 and a gesture control device 204. The stereographic display device 202 can be worn by a user to visualize a three dimensional visualization 206 of downhole data on ad display 210 (shown in FIG. 3B). The stereographic display device 202 can have one or more sensors to measure a user's gaze and the location and orientation of a user's head.

The stereographic display device 202 can present virtual user controls 208 on the display 210 to allow a user to interact with the three dimensional visualization 206. The user controls 208 can be overlaid on the three dimensional visualization 206 or displayed separately in an unused portion of the display 210. In some instances, the user controls 208 are direction controls to adjust the three dimensional visualization 206 on the display 210. In other instances, the user controls 208 are notations, filters, comment boxes, or other designators to manipulate the three dimensional visualization 206.

The gesture control device 204 can allow the user to interact with the three dimensional visualization 206 and the user controls 208. The gesture control device 204 can receive an input from a user and manipulate the three dimensional visualization 206 in response to the input. The input can adjust the view of the three dimensional visualization 206, apply a filter to the three dimensional visualization 206, or open a comment box to provide notation within the three dimensional visualization 206.

The input received from the gesture control device 204 can be a user movement, including but not limited to, rotation, lateral/vertical or any movement therebetween, or command provided by a user's hand. As depicted in FIG. 2, the gesture control device 204 can be one or more gloves disposed around a user's hand(s) and configured to track spatial movement of the hand relative to the three dimensional visualization 206. Additional embodiments of a gesture control device are described with respect to FIGS. 4A-4C.

Figure 3A:
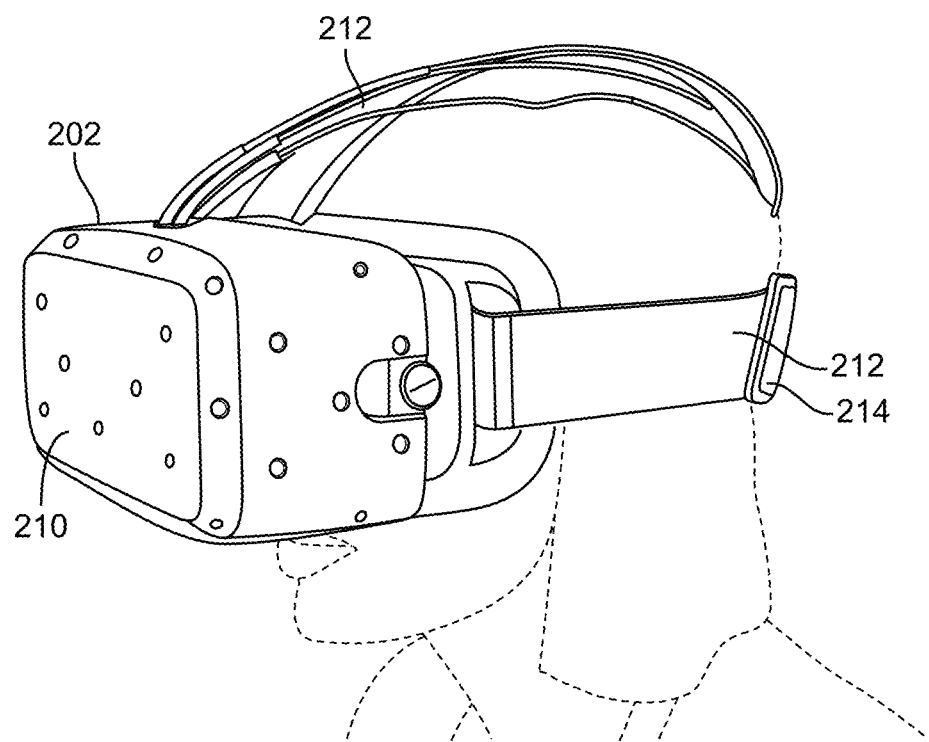
FIG. 3A is an isometric view of a stereographic display device of an interactive three dimensional virtual reality system according to an exemplary embodiment.

FIG. 3A illustrates an example embodiment of a stereographic display device 202. The stereographic display device 202 can have one or more straps 212 to secure the stereographic display device 202 to a user's head. The one or more straps 212 can include an adjustable lateral strap 214 coupled with opposing sides of the stereographic display device 202 and an adjustable support strap coupled with the upper surface of the stereographic display device 202 and the lateral strap 214. The one or more straps 212 can be adjustable to various the lengths and accommodate a variety of users and can be formed from an elastic material providing a compressive yet comfortable fit. In some instances, the stereographic display device 202 is a housing configured to receive an electronic device having a display. In other instances, the stereographic display device 202 has a display disposed therein.

Figure 3B:
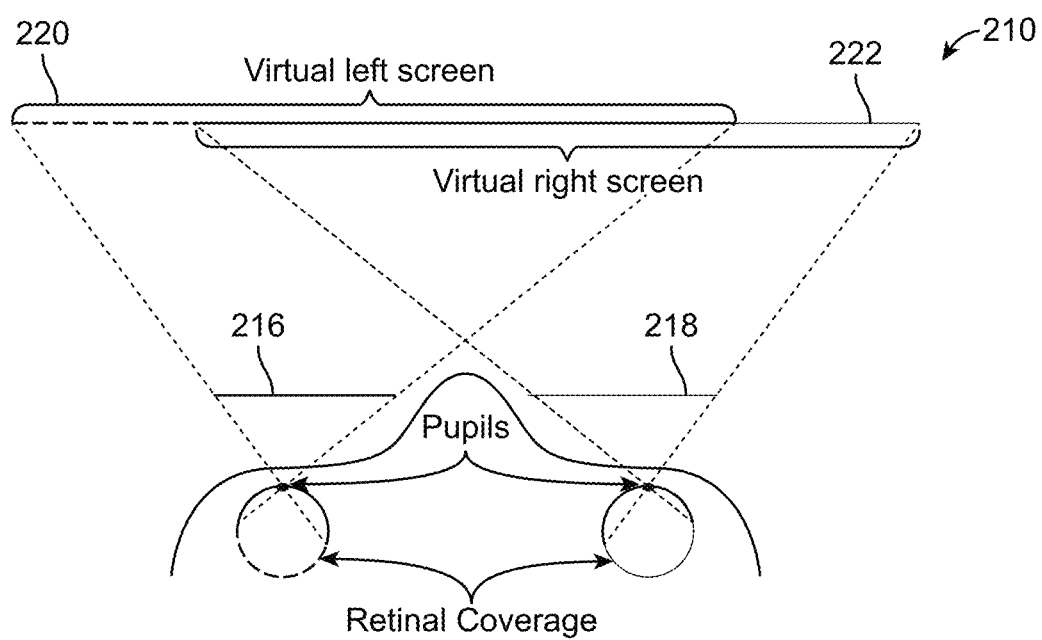
FIG. 3B is diagrammatic view of a stereographic display arrangement.

FIG. 3B illustrates a stereographic display. The stereographic display device 202 can project two distinct images associated with a user's left and right eye, respectively, as would be experienced if viewed by the user's naked eye and the brain interprets the combined image as having the correct depth, thereby generating a three dimensional virtualization 206 (shown in FIG. 2).

The display 210 can be formed by the two independent displays or one display with the two distinct images 216, 218 displayed on vertically adjacent halves so as to be viewed by individual eyes. As depicted in FIG. 3B, the stereographic display 210 has a left screen 216 and a right screen 218.

These images are viewed as partially overlapping, as depicted by virtual screens 220, 222, by the user's brain to perceive depth and produce a three dimensional virtualization 206.

Figure 4A:
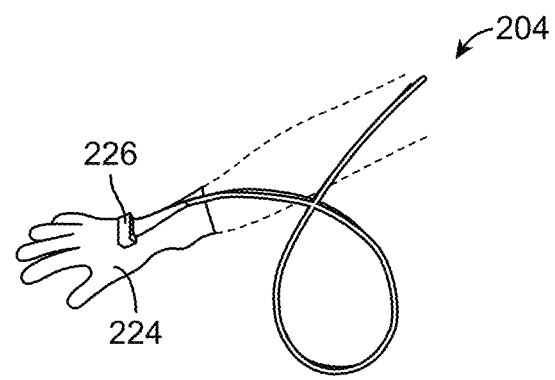
FIG. 4A is an isometric view of a gesture control device of an interactive three dimensional virtual reality system according to an exemplary embodiment.
Figure 4B:
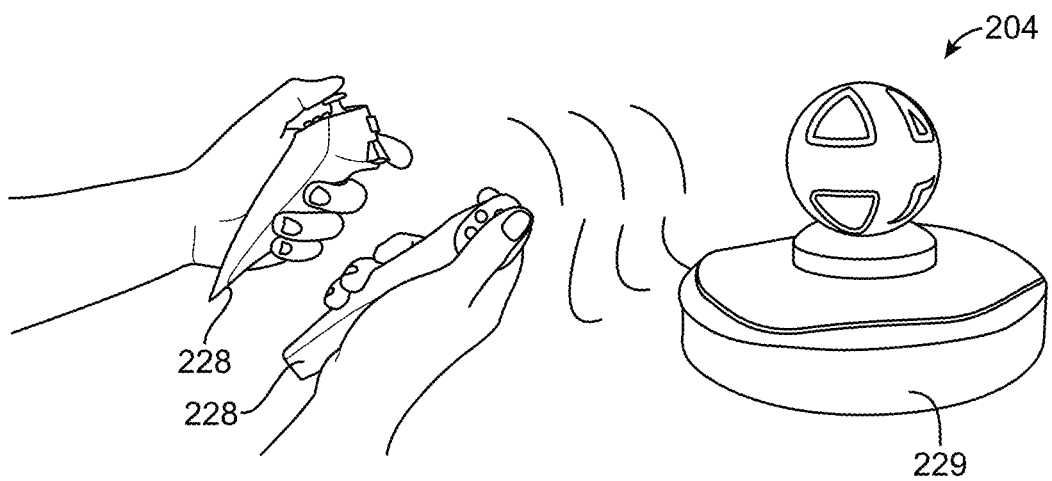
FIG. 4B is an isometric view of a second gesture control device of an interactive three dimensional virtual reality system according to an exemplary embodiment.
Figure 4C:
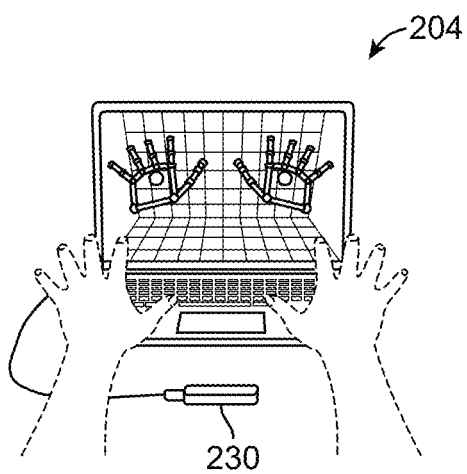
FIG. 4C is an isometric view of a third gesture control device of an interactive three dimensional virtual reality system according to an exemplary embodiment.

FIGS. 4A, 4B, and 4C illustrate example embodiments of a gesture control device 204. As depicted in FIG. 4A, the gesture control device 204 can be a glove 224 worn by a user. The glove 224 can have one or more sensors 226 to detect motion or movement of a user's hand within the glove 224. The one or more sensors 226 can be strain/stress sensors to detect movement of a hand and/or fingers, or can be an accelerometer/gyroscopic sensors to detect motion of a hand and/or fingers. In other instances, the glove 224 can include pressure/contact sensors to detect the glove's 224 interaction with an environment or other pressure sensors (for example, two fingers pinching each other).

As depicted in FIG. 4B, the gesture control device 204 can be a controller 228 held by a user in one hand or both hands. The controller 228 can include one or more buttons and/or joysticks to receive input from a user. The controller 228 can additionally include one or more sensors as described above, such accelerometer/gyroscopic sensors to detect movement of the controller. The controller 228 can wirelessly couple with a base station 229 coupled with the system 200.

As depicted in FIG. 4C, the gesture control device 204 can be a motion controller 230 configured to wireless detect the movement or motion of a user's. The motion controller 230 can be a camera configured to track a user's hands movements using advanced image processing. The motion controller 230 may obviate any handheld device such as a glove 224 or handheld controller 228, but requires line of sight between the users hands and the camera at all times. The motion controller 230 is not limited to hand movement or gestures and can be configured to track a user's head, other appendages (for example, legs) or any other object (for example, pencil).

While example embodiments of gesture control devices are described above, other gesture control devices can be implemented within the present disclosure. The stereographic display device 202 can be implemented with a gesture control device 204 disposed therein for tracking the movement and motion of a user's head. The head tracking device can be a motion controller 230 and/or one or more sensors such as accelerometer/gyroscopic sensors.

Figure 5:
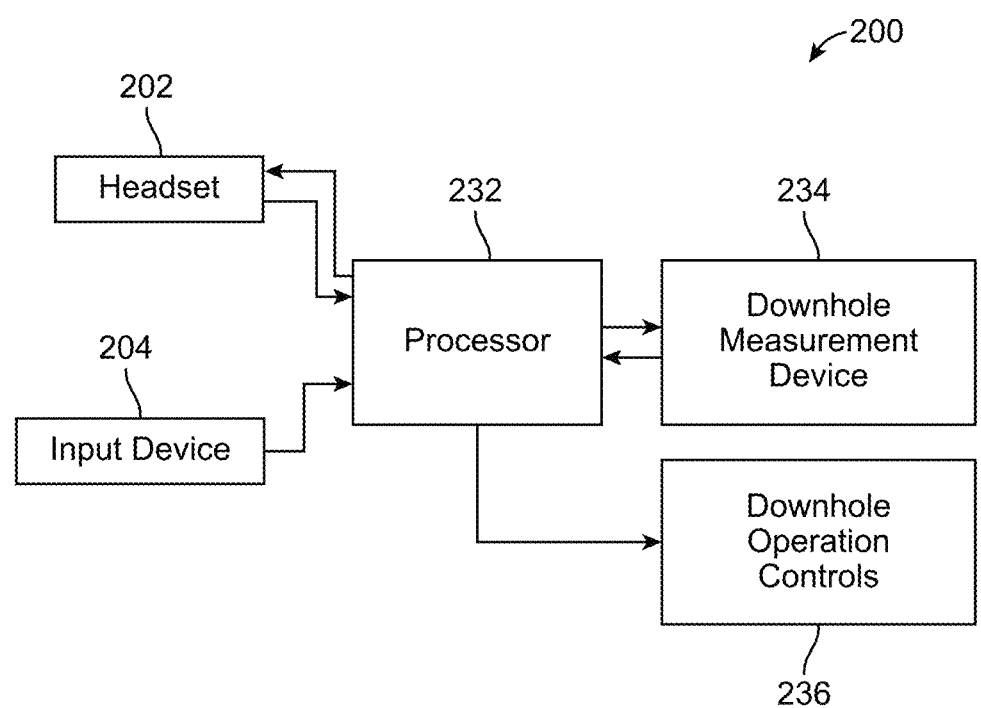
FIG. 5 is a diagrammatic view of an interactive three dimensional virtual reality system.

FIG. 5 illustrates an interactive virtual reality apparatus 200. The interactive virtual reality apparatus 200 can include the stereographic display device 202 (also referred to as a headset), a gesture control device 204 (also referred to as an input device), a processor 232, a downhole measurement device 234, and downhole operation controls 236.

The stereographic display device 202 and gesture control apparatus 204 can be coupled with the processor 232. The processor can include a central processing unit (CPU) and/or a graphical processing unit (GPU), as well an operating system. In some instances, the processor 232 and the gesture control device 204 are disposed within the stereographic display device 202.

The processor 232 sends and receives signals from the stereographic display device 202 and receives input from the gesture control device 204. The processor 232 can also be coupled with a downhole measurement device 234. The downhole measurement device 234 provides a measured signal with information relating to a downhole environment. The downhole measurement device 234 can be a open-hole or cased-hole logging tool, MWD/LWD tool, or a permanent monitoring system. The processor 232 can send and receive signals from the downhole measurement device 234 in real time during operations, or can receive a previously measured signal from the downhole measurement device 234. The processor 232 can form a three dimensional visualization of the downhole environment from the signals received from the downhole measurement device 234 and display the visualization on the stereographic display device 202.

The processor 232 can also be communicatively coupled with a downhole operation controls 236 and allow the interactive virtual reality apparatus to send signals from the gesture control apparatus 204 to the downhole operations control 236. In a MWD or LWD scenario, the processor 232 can receive an input from the gesture control device 204 in response to a visualization on the stereographic display device 202 and the processor 232 can send command to the downhole operations control 236 control the downhole operation, such as logging, monitoring, or drilling, and/or to perform corrective action.

In some instances, the processor 232 can receive an input signal from the gesture control device 204 and send a command to the downhole measurement device 234 and downhole operations control 236 to alter the drilling operation direction.

Figure 6:
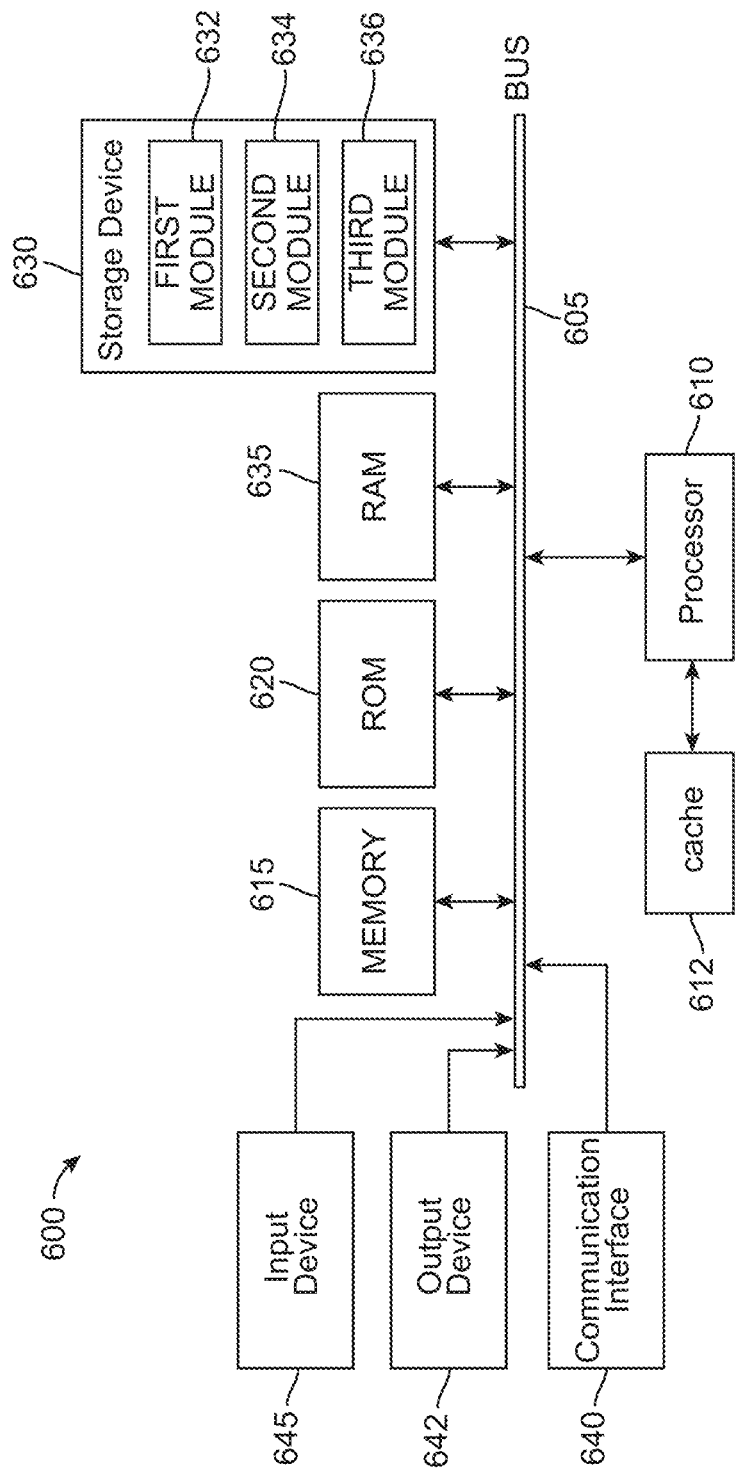
FIG. 6 is a diagrammatic view of a conventional system bus computing system architecture, according to an exemplary embodiment.

FIG. 6 illustrates a conventional system bus computing system architecture 600 wherein the components of the system are in electrical communication with each other using a bus 605. System 600 can include a processing unit (CPU or processor) 610 (which may be the same as processor 232 as described in FIG. 5 for implementing the interactive virtual reality system disclosed herein) and a system bus 605 that couples various system components including the system memory 615, such as read only memory (ROM) 620 and random access memory (RAM) 635, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. It can be appreciated that the disclosure may operate on a computing device 600 with more than one processor 610 or on a group or cluster of computing devices networked together to provide greater processing capability. The processor 610 can include any general purpose processor and a hardware module or software module, such as first module 632, second module 634, and third module 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

The system bus 605 may be any of several types of bus structures including a memory bus or a memory controller, a peripheral bus, and a local bus using any of a variety of bus architectures. A basic input/output (BIOS) stored in ROM 620 or the like, may provide the basic routine that helps to transfer information between elements within the computing device 600, such as during start-up. The computing device 600 further includes storage devices 630 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 630 can include software modules 632, 634, 636 for controlling the processor 610. The system 600 can include other hardware or software modules. The storage device 630 is connected to the system bus 605 by a drive interface. The drives and the associated computer-readable storage devices provide non-volatile storage of computer-readable instructions, data structures, program modules and other data for the computing device 600. In one aspect, a hardware module that performs a particular function includes the software components shorted in a tangible computer-readable storage device in connection with the necessary hardware components, such as the processor 610, bus 605, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 610 executes instructions to perform "operations", the processor 610 can perform the operations directly and/or facilitate, direct, or cooperate with another device or component to perform the operations.

To enable user interaction with the computing device 600, an input device 645 can represent any number of input mechanisms, such as a gesture control device disclosed herein, as well as other inputs such as a microphone for speech, a touch-sensitive screen for gesture or graphical input, keyboard, mouse, motion input, speech and so forth. An output device 642 can include the stereographic display device display herein, or display screen or other graphical user interface, and may also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 625, ROM 620, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 600 shown in FIG. 6A can practice all or part of the recited methods, can be a part of the recited systems, and/or can operate according to instructions in the recited tangible computer-readable storage devices.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 610 can include all types of processors disclosed herein, including a virtual processor. However, when referring to a virtual processor, the processor 610 includes the software components associated with executing the virtual processor in a virtualization layer and underlying hardware necessary to execute the virtualization layer. The system 600 can include a physical or virtual processor 610 that receives instructions stored in a computer-readable storage device, which causes the processor 610 to perform certain operations. When referring to a virtual processor 610, the system also includes the underlying physical hardware executing the virtual processor 610.

Figure 7:
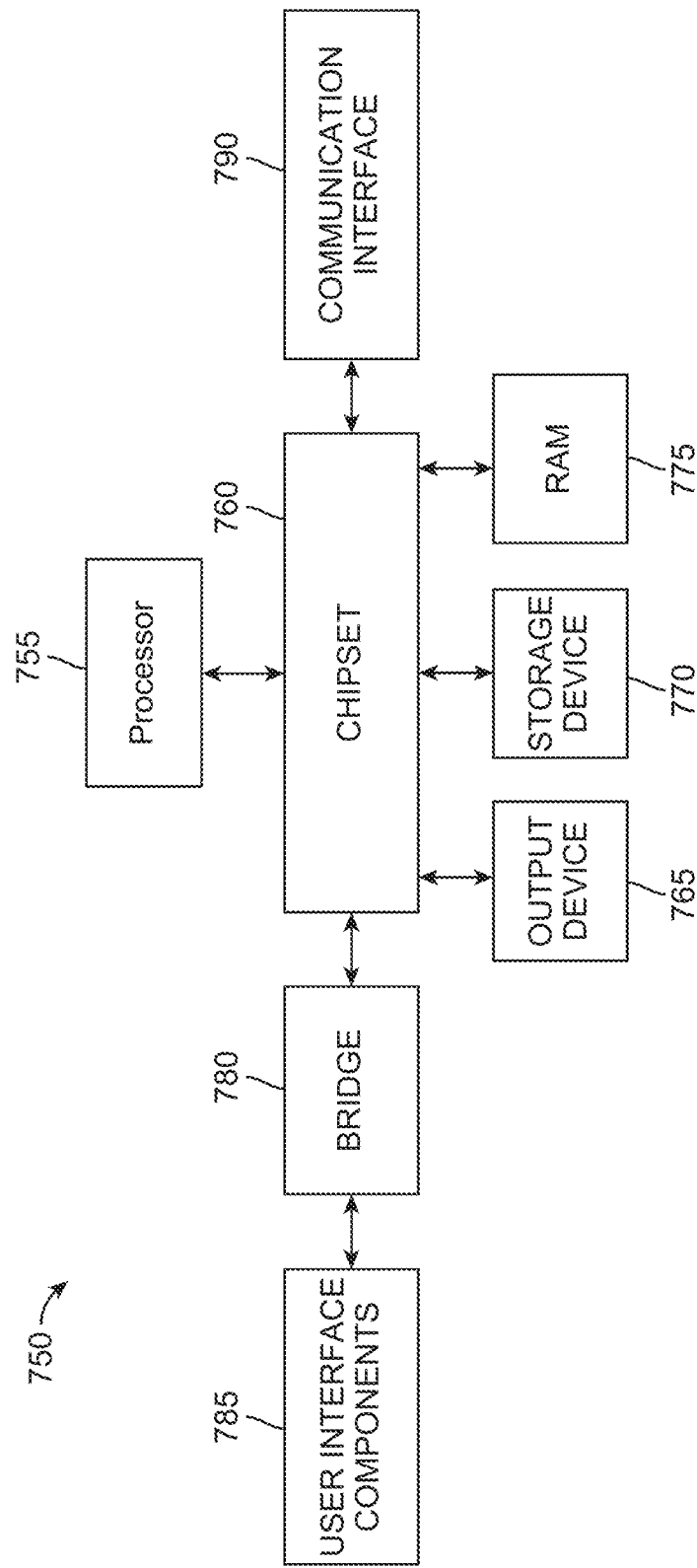
FIG. 7 is a diagrammatic view of a computer system having a chipset architecture, according to an exemplary embodiment.

FIG. 7 illustrates an example computer system 750 having a chipset architecture that can be used in executing the described method and generating and displaying a graphical user interface (GUI). Computer system 750 can be computer hardware, software, and firmware that can be used to implement the disclosed technology. System 750 can include a processor 755 (which may be the same as processor 232 as described in FIG. 5 for implementing the interactive virtual reality system disclosed herein), representative of any number of physically and/or logically distinct resources capable of executing software, firmware, and hardware configured to perform identified computations. Processor 755 can communicate with a chipset 760 that can control input to and output from processor 755. Chipset 760 can output information to output device 765, such as a display, and can read and write information to storage device 770, which can include magnetic media, and solid state media. Chipset 760 can also read data from and write data to RAM 775. A bridge 780 for interfacing with a variety of user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or RAM 775. Further, the machine can receive inputs from a user via user interface components 785 and execute appropriate functions, such as browsing functions by interpreting these inputs using processor 755.

It can be appreciated that systems 700 and 750 can have more than one processor 610, 755 or be part of a group or cluster of computing devices networked together to provide processing capability. For example, the processor 610, 755 can include multiple processors, such as a system having multiple, physically separate processors in different sockets, or a system having multiple processor cores on a single physical chip. Similarly, the processor 610 can include multiple distributed processors located in multiple separate computing devices, but working together such as via a communications network. Multiple processors or processor cores can share resources such as memory 715 or the cache 612, or can operate using independent resources. The processor 610 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 610, that is purpose-built to operate as an equivalent to software executing on a general purpose processor. For example, the functions of one or more processors represented in FIG. 6 may be provided by a single shared processor or multiple processors (use of the term "processor" should not be construed to refer exclusively to hardware capable of executing software.) Illustrative embodiments may include microprocessor and/or digital signal processor (DSP) hardware, ROM 620 for storing software performing the operations described below, and RAM 635 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Figure 8:
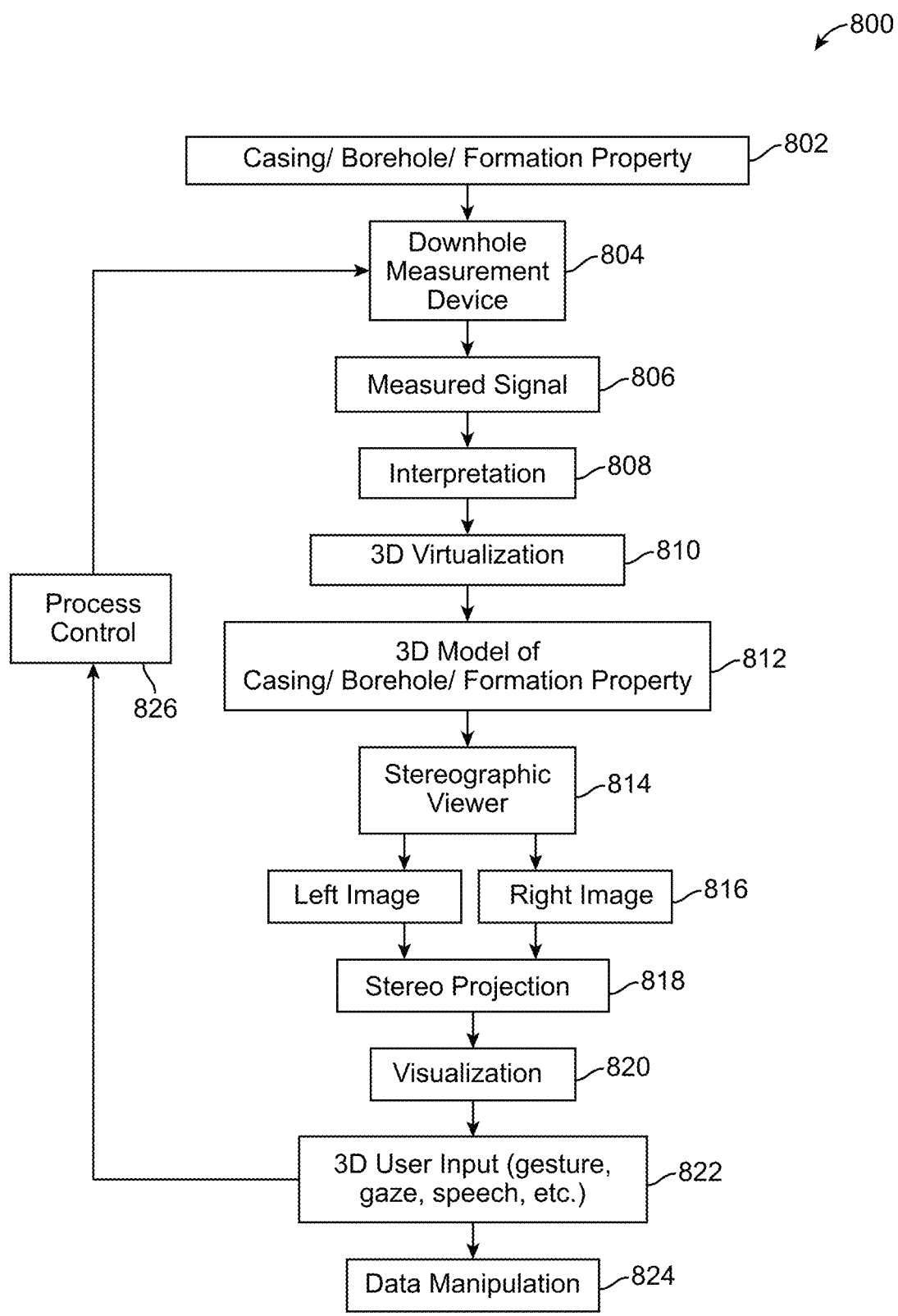
FIG. 8 is a flow chart of an interactive three dimensional virtual reality system according to an exemplary embodiment.

FIG. 8 illustrates an example method for using an interactive virtual reality apparatus 100. Referring to FIG. 8, a flowchart is presented in accordance with an example embodiment. The example method 800 is provided by way of example, as there are a variety of ways to carry out the method 800. The method 800 described below can be carried out using the configurations illustrated in FIGS. 1-7, for example, and various elements of these figures are referenced in explaining example method 800. Each block shown in FIG. 8 represents one or more processes, methods or subroutines, carried out in the example method 800. Furthermore, the illustrated order of blocks is illustrative only and the order of the blocks can change according to the present disclosure. Additional blocks may be added or fewer blocks may be utilized, without departing from this disclosure. The example method 800 can begin at block 802.

At block 802, the method 800 can have a casing, borehole, or formation property. The casing, borehole, or formation property can be configured to receive one or more downhole measurement devices, such as a drill string with MWD sensors, a well logging apparatus or a permanent well monitoring tool.

At block 804, the downhole measurement device can be inserted into the casing, wellbore, or formation. The downhole measurement device can be received during drilling operations (shown in FIG. 1A) or during a pause in drilling operations (shown in FIG. 1B). The downhole measurement device can include, but is not limited to, a resistivity logging tool, corrosion inspection tool, and a permanently installed reservoir monitoring tool.

At block 806, the downhole measurement device generates a measured signal. The measured signal can be a data set acquired by the downhole measurement device relative to the downhole environment.

At block 808, the measured signal is interpreted. Interpretation of the measured signal allows the data set acquired by the downhole measurement device to form a graphic representation of the downhole environment.

At block 810, the interpreted measured signal generates a three dimensional virtualization. The three dimensional virtualization can be a two dimensional representation of the measured signal, but having three dimensional properties for display by the stereographic display device.

At block 812, the three dimensional virtualization can form a three dimensional model of the casing, borehole, or formation property. In some instances, the three dimensional virtualization and three dimensional model can be the same and/or the method 800 can implement the three dimensional virtualization and three dimensional model simultaneously.

At block 814, the three dimensional model is presented to a stereographic display device. The stereographic display device is configured to be worn by a user to present the three dimensional model.

At block 816, the stereographic display device presents the user with two distinct images. A left image is displayed for viewing by the user's left eye and a right image is displayed for viewing by the user's right eye.

At block 818, the left image and right image form a stereo projection as shown in FIG. 3B. The stereo image involves the left image and the right image being viewed by the corresponding user eye. The left and right image have a parallax between them.

At block 820, a visualization can be generated by the user induced by the user viewing the left image and the right image. The user's brain interprets the parallax between the two images as depth, thereby causing the user to see a three dimensional visualization of the measured signal.

At block 822, the method 800 can receive a user input from a gesture control device in response to the visualization. The user input from the gesture control device can be finger/hand manipulation, head movement, speech, gaze, or another gesture received by the stereographic display device or gesture control device. In some instances, the user input can be null.

At block 824, the user input can manipulate the visualization and contents of the three dimensional view. The user can pan, zoom in/out, and rotate the view of the visualization displayed by the stereographic display device. Scroll bars, dropdown menus, check boxes, radio buttons, and similar graphical user interface (GUI) features can be presented within the within the visualization for input from the gesture control device.

At block 826, a process control can manipulate the downhole measurement device in response to the input received from the gesture control device. The input from the gesture control device can manipulate the view, the data, or the entire measurement and/or drilling process. In some instances, the process control can manipulate the measured signal or the three dimensional virtualization depending on the input received from the gesture control device and/or the process being implemented. For example, a gesture to zoom in/out can manipulate the three dimensional virtualization or a gesture for a comment box can manipulate the measured signal.

Figure 9:
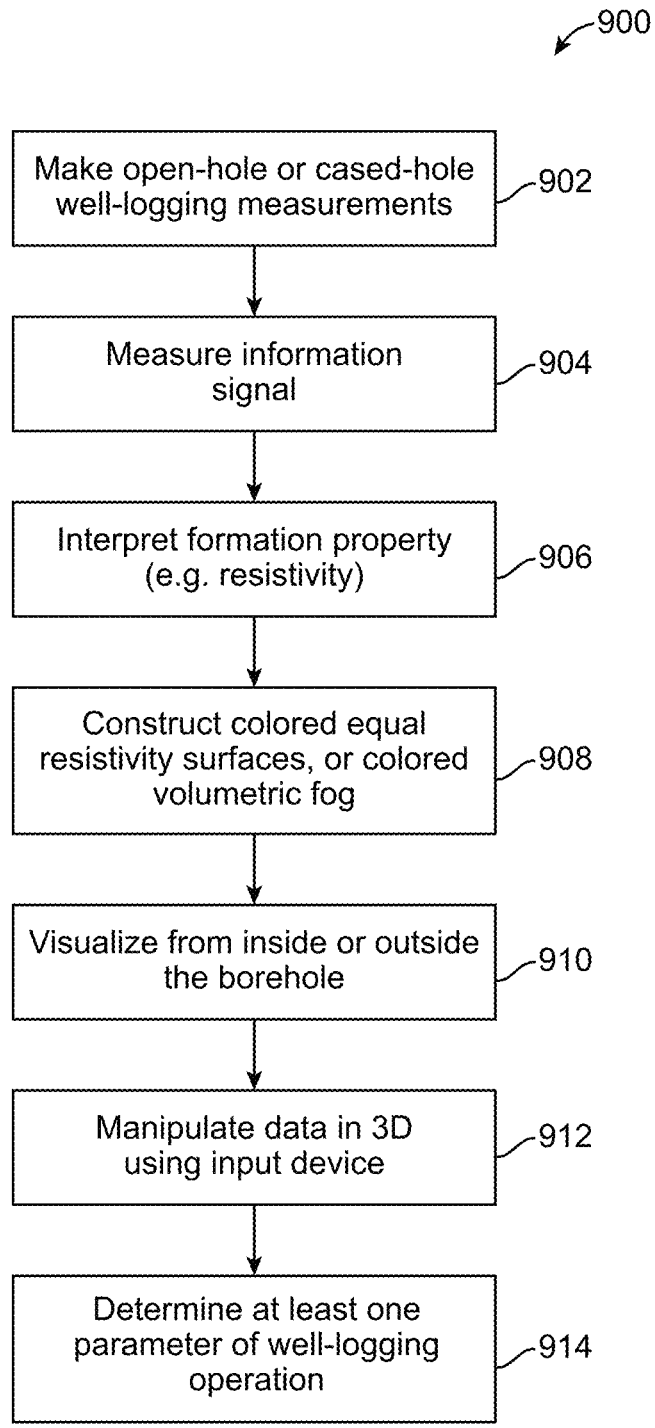
FIG. 9 is a flow chart of an interactive three dimensional virtual reality system for a well logging operation.

FIG. 9 illustrates an example method 900 for using an interactive virtual reality apparatus 100 within an open-hole or cased hole environment. The method 900 can be a specific iteration of method 800 described above with respect to FIG. 8. Referring to FIG. 9, a flowchart is presented in accordance with an example embodiment. The example method 900 is provided by way of example, as there are a variety of ways to carry out the method 900. The method 900 described below can be carried out using the configurations illustrated in FIGS. 1-8, for example, and various elements of these figures are referenced in explaining example method 900. Each block shown in FIG. 9 represents one or more processes, methods or subroutines, carried out in the example method 900. Furthermore, the illustrated order of blocks is illustrative only and the order of the blocks can change according to the present disclosure. Additional blocks may be added or fewer blocks may be utilized, without departing from this disclosure. The example method 900 can begin at block 902.

At block 902, a well-logging measurement of an open-hole or cased-hole is made. The downhole measurement can be an open-hole or cased-hole well-logging operation.

At block 904, the formation signal is measured to generate a measured signal. The formation signal can measure resistivity, slowness, porosity, etc.

At block 906, the formation property(s) are interpreted.

At block 908, colored equal surfaces, or colored volumetric fog is constructed. The interpreted formation property(s) can be visually represented in three dimensions by a colored iso-parameter surface or colored volumetric fog. Each formation property can be visually represented by a different iso-parameter surface or colored volumetric fog. In some instances, multiple formation properties can be overlaid and viewed collectively or individually.

At block 910, a visualization of the outside and/or inside of the borehole is created. The visualization can be presented to the user by a stereographic display device. The visualization can be a three dimensional view of the colored iso-parameter surface or colored volumetric fog.

At block 912, the visualization of the borehole (outside and/or inside) is manipulated by the gesture control device. The gesture control device can manipulate the view of the visualization, manipulate the visualization, or manipulate the measurement of the formation signal. In some instances, the manipulation of the visualization can include hiding a colored iso-parameter or adding another colored iso-parameter. The input can also allow the user to manipulate the three dimensional visualization by smoothing an iso-parameter surface.

At block 914, at least one parameter of the well-logging operation is determined. The input can allow a user to specify the parameters for a more detailed logging pass, such as beginning/end, depth, speed, or any other logging parameter to provide a more detailed view of a critical casing segment.

Figure 10:
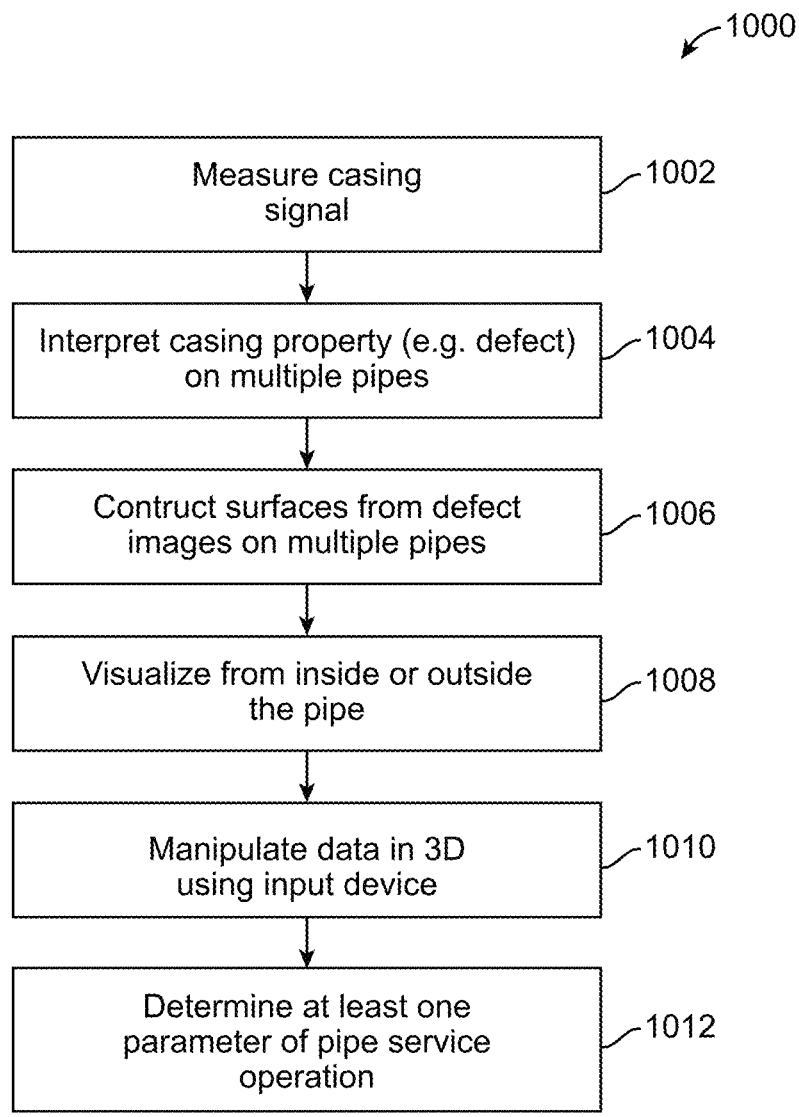
FIG. 10 is a flow chart of an interactive three dimensional virtual reality system for a cased-hole pipe service operation.

FIG. 10 illustrates an example method 1000 for using an interactive virtual reality apparatus 100 within an cased hole service operation. The method 1000 can be a specific iteration of method 800 described above with respect to FIG. 8. Referring to FIG. 10, a flowchart is presented in accordance with an example embodiment. The example method 1000 is provided by way of example, as there are a variety of ways to carry out the method 1000. The method 1000 described below can be carried out using the configurations illustrated in FIGS. 1-8, for example, and various elements of these figures are referenced in explaining example method 1000. Each block shown in FIG. 10 represents one or more processes, methods or subroutines, carried out in the example method 1000. Furthermore, the illustrated order of blocks is illustrative only and the order of the blocks can change according to the present disclosure. Additional blocks may be added or fewer blocks may be utilized, without departing from this disclosure. The example method 1000 can begin at block 1002.

At block 1002, the downhole measurement comprises a cased-hole pipe service operation. The cased-hole pipe is measured by a downhole tool.

At block 1004, the cased-hole pipe casing property is interpreted. The interpretation of the casing property can occur across multiple pipes within the cased-hole. In some instances, the casing property is a defect. In some instances the downhole measurement of block 1002 and interpretation of block 1004 can be combined to produce a measured signal.

At block 1006, one or more surfaces can be constructed from the interpreted casing properties across multiple pipes. The one or more constructed surfaces can represent multiple concentric casing pipes.

At block 1008, the one or more surfaces can be visualized either from inside or outside of the casing pipe. The visualization can be a three dimensional visualization displayed in the stereographic viewer and allow the user to see the measured signal in a three dimensional environment. The three dimensional visualization can represent a casing property including, but not limited to, metal loss, defects, and surface profile.

At block 1010, the three dimensional visualization can be manipulated using the gesture control device. The three dimensional visualization can be manipulated to remove and/or smooth over known defects on the casing, such as casing collars and perforations, thereby allowing other defects (e.g. corrosion) to stand out.

At block 1012, the three dimensional visualization can also be manipulated to set determine one or more parameters for a succeeding pipe service run. In some instances, the succeeding pip service run can be a more detailed logging pass, such as beginning/end depth, speed, etc.

Figure 11:
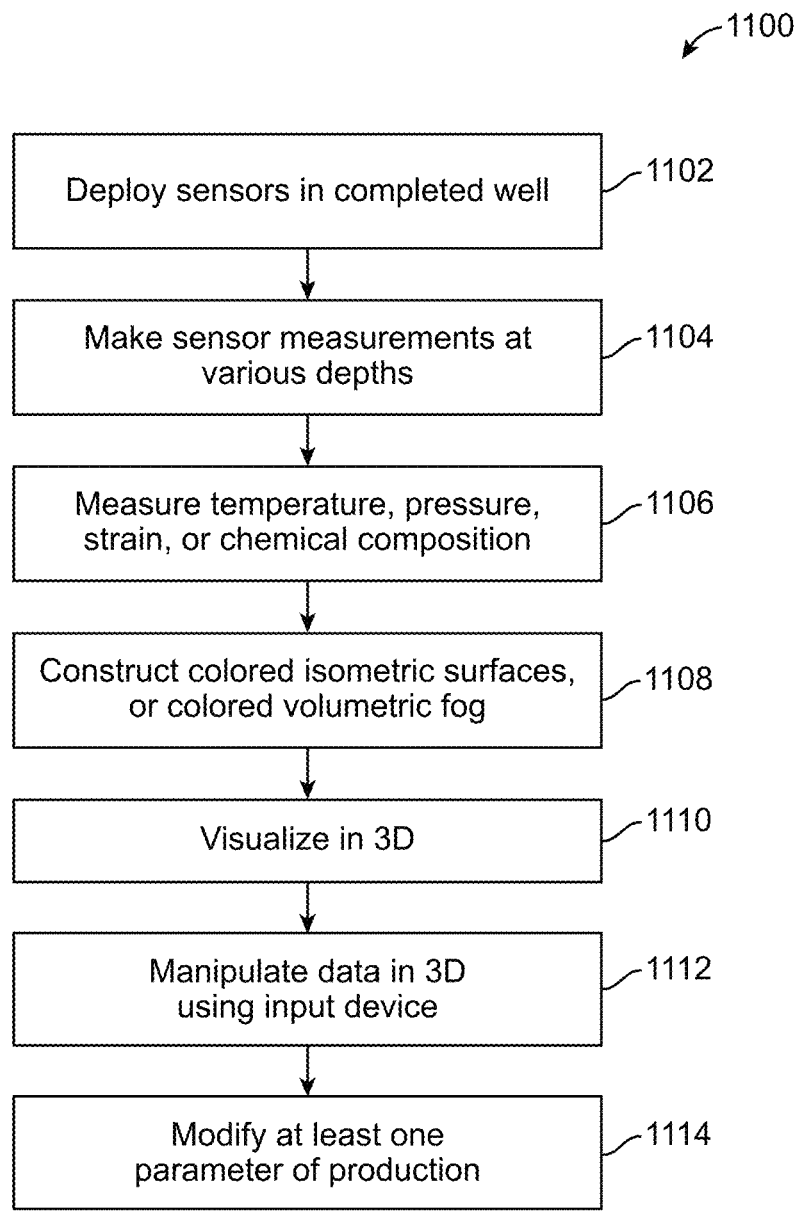
FIG. 11 is a flow chart of an interactive three dimensional virtual reality system for a well monitoring operation.

FIG. 11 illustrates an example method 1100 for using an interactive virtual reality apparatus 100 for controlling a well monitoring system. The method 1100 can be a specific iteration of method 800 described above with respect to FIG. 8. Referring to FIG. 11, a flowchart is presented in accordance with an example embodiment. The example method 1100 is provided by way of example, as there are a variety of ways to carry out the method 1100. The method 1100 described below can be carried out using the configurations illustrated in FIGS. 1-8, for example, and various elements of these figures are referenced in explaining example method 1100. Each block shown in FIG. 11 represents one or more processes, methods or subroutines, carried out in the example method 1100. Furthermore, the illustrated order of blocks is illustrative only and the order of the blocks can change according to the present disclosure. Additional blocks may be added or fewer blocks may be utilized, without departing from this disclosure. The example method 1100 can begin at block 1102.

At block 1102, one or more sensors can be deployed within a completed wellbore. The one or more sensors can be disposed along the length of cased wellbore and configured to monitor one or more borehole parameters (e.g. temperature, pressure, chemical composition, etc.) at various depths. In some instances, the one or more sensors are permanent sensors disposed within an intelligent well completion. Fiber optic lines can also be conveyed downhole for temperature, pressure, or strain sensing and can be permanent or temporary. The one or more sensors can yield distributed data over the entire length of the fiber or at one or more along the fiber.

At block 1104, the one or more sensors measure predetermined parameters at various depths.

At block 1106, the one or more sensors measure temperature, pressure, strain, and/or chemical composition.

At block 1108, colored isometric surfaces, or colored volumetric fogs are formed using the data collected from the one or more sensors.

At block 1110, a three dimensional visualization is formed. The colored isometric surfaces can be overlaid with the borehole surfaces or the monitoring data can be represented as three dimensional volumetric fog. In some instances, a temperature map, pressure map, or strain map can be overlaid with the borehole surfaces.

At block 1112, the user can manipulate data in the three dimensional visualization using the gesture control device.

At block 1114, the user can modify at least one parameter of production, such as hydraulic fracturing parameters, production zone isolation, flow control, valve opening/shutoff, etc. These controls can be present in the three dimensional interactive virtual reality apparatus via buttons, menus, and/or other GUI features. In some instances, the user can modify the three dimensional visualization itself, such as smoothing over a three dimensional surface representation or otherwise manipulated by the gesture control device.

Figure 12:
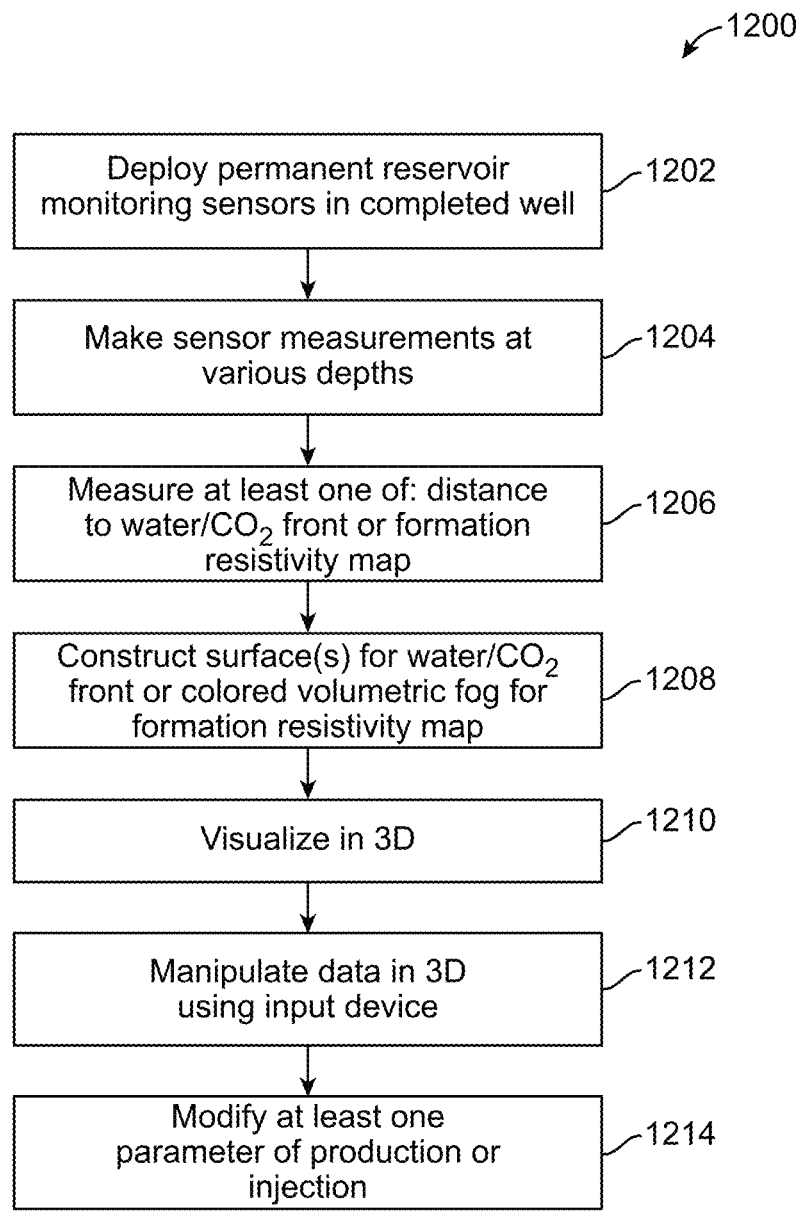
FIG. 12 is a flow chart of an interactive three dimensional virtual reality system for a permanent reservoir monitoring operation.

FIG. 12 illustrates an example method 1200 for using an interactive virtual reality apparatus 100 for permanent reservoir monitoring operation, in some instances in an enhanced oil recovery (EOR) scenario. The method 1200 can be a specific iteration of method 800 described above with respect to FIG. 8. Referring to FIG. 12, a flowchart is presented in accordance with an example embodiment. The example method 1200 is provided by way of example, as there are a variety of ways to carry out the method 1200. The method 1200 described below can be carried out using the configurations illustrated in FIGS. 1-8, for example, and various elements of these figures are referenced in explaining example method 1200. Each block shown in FIG. 12 represents one or more processes, methods or subroutines, carried out in the example method 1200. Furthermore, the illustrated order of blocks is illustrative only and the order of the blocks can change according to the present disclosure. Additional blocks may be added or fewer blocks may be utilized, without departing from this disclosure. The example method 1200 can begin at block 1202.

At block 1202, one or more permanent reservoir monitoring sensors are deployed in a completed well. The one or more sensors can be distributed along the length of the well. In some instances, the one or more sensors are evenly distributed along the length or can be distributed with higher density at predetermined depths having particular interest.

At block 1204, the one or more permanent reservoir monitoring sensors make sensor measurements at various depths.

At block 1206, the one or more permanent reservoir monitoring sensors measure at least one of distance to water/$CO_2$ front or formation resistivity map. In EOR, an injection well injects an injecting agent (water or $CO_2$) into the formation to enhance projection in a nearby production well by displacing the hydrocarbons in the surrounding formation. The one or more sensors can detect and measure the shape and/or distance of the incoming water or $CO_2$ front.

At block 1208, the method 1200 can construct a surface for the water/CO2 front or a colored volumetric fog for the formation resistivity map.

At block 1210, a three dimensional visualization is formed. The colored isometric surfaces can be overlaid with the borehole surfaces or the monitoring data can be represented as three dimensional volumetric fog. The incoming water or CO2 front can be represented in three dimensions as a virtual surface or a series of virtual surfaces. Alternatively, a formation property, such as resistivity, slowness, or the like, indicating the presence of the injection agent can be represented as a three dimensional volumetric fog.

At block 1212, the user can manipulate data in the three dimensional visualization using the gesture control device.

At block 1214, the user can modify at least one parameter of production or injection. In response to the three dimensional visualization, the user can virtually control the injection well and/or the production well depending on the state of the incoming water or $CO_2$ front. In some instances, the injection zones on the injection well can be manipulated virtually or the valves on the production well can be virtually opened/shut off at certain areas.

Figure 13:
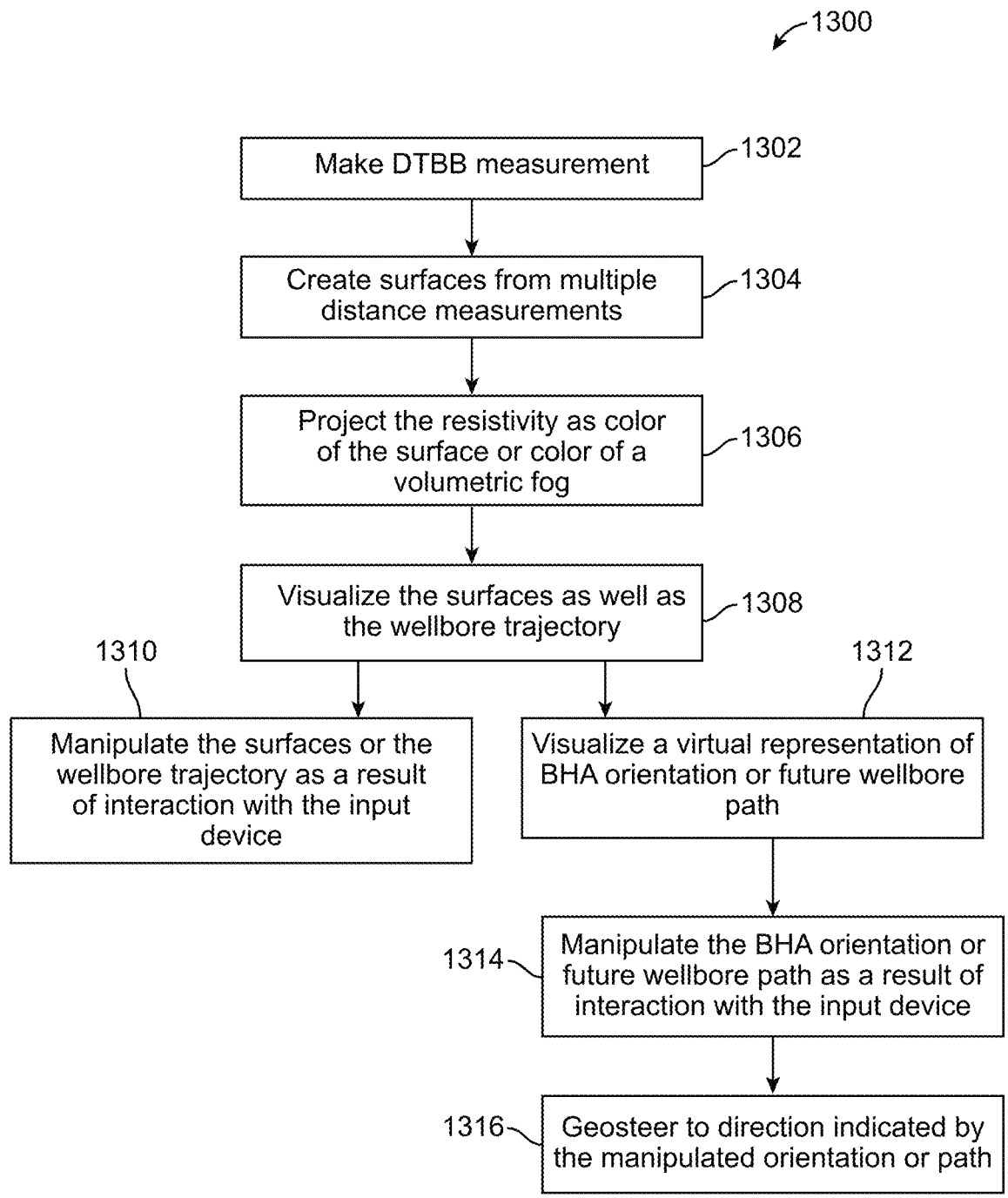
FIG. 13 is a flow chart of an interactive three dimensional virtual reality system for a drilling operation.

FIG. 13 illustrates an example method 1300 for using an interactive virtual reality apparatus 100 for distance to a bed boundary (DTBB) measurement. The method 1300 can be a specific iteration of method 800 described above with respect to FIG. 8. Referring to FIG. 13, a flowchart is presented in accordance with an example embodiment. The example method 1300 is provided by way of example, as there are a variety of ways to carry out the method 1300. The method 1300 described below can be carried out using the configurations illustrated in FIGS. 1-8, for example, and various elements of these figures are referenced in explaining example method 1300. Each block shown in FIG. 13 represents one or more processes, methods or subroutines, carried out in the example method 1300. Furthermore, the illustrated order of blocks is illustrative only and the order of the blocks can change according to the present disclosure. Additional blocks may be added or fewer blocks may be utilized, without departing from this disclosure. The example method 1300 can begin at block 1302.

At block 1302, the downhole measurements can include a MWD operation that measures a DTBB and the resistivities on the two sides of the boundary.

At block 1304, the method 1300 can create surfaces from multiple distance measurements. The boundary can be represented as a surface in the three dimensional view.

At block 1306, the method 1300 can project the resistivity as color of the surface or color of a volumetric fog.

At block 1308, the surfaces can be visualized in three dimensions along with the wellbore trajectory. The past wellbore trajectory and the future (projected or estimated) wellbore trajectory can also be overlaid on the three dimensional visualization of the downhole measurements. The method 1300 can proceed to block 1310 for manipulation of the surfaces or block 1312 for visualization a bottom hole assembly (BHA).

At block 1310, the surfaces and/or wellbore trajectory can be manipulated using the gesture control device.

At block 1312, the method 1300 generates a visualization of a virtual representation of a BHA orientation or future wellbore path. The user can virtually manipulate the future wellbore trajectory using hand gestures, virtual buttons and/or virtual menus.

At block 1314, the BHA orientation or future wellbore path can be manipulated by the user as a result of interaction with the gesture control device. The user can virtually manipulate the future wellbore path using hand gestures, virtual buttons and/or virtual menus. The virtual manipulation can then be processed and transmitted to the drilling system as the method proceeds to block 1316.

At block 1316, the drilling system and the BHA can geosteer to the direction indicated by the manipulated orientation or path.

Figure 14:
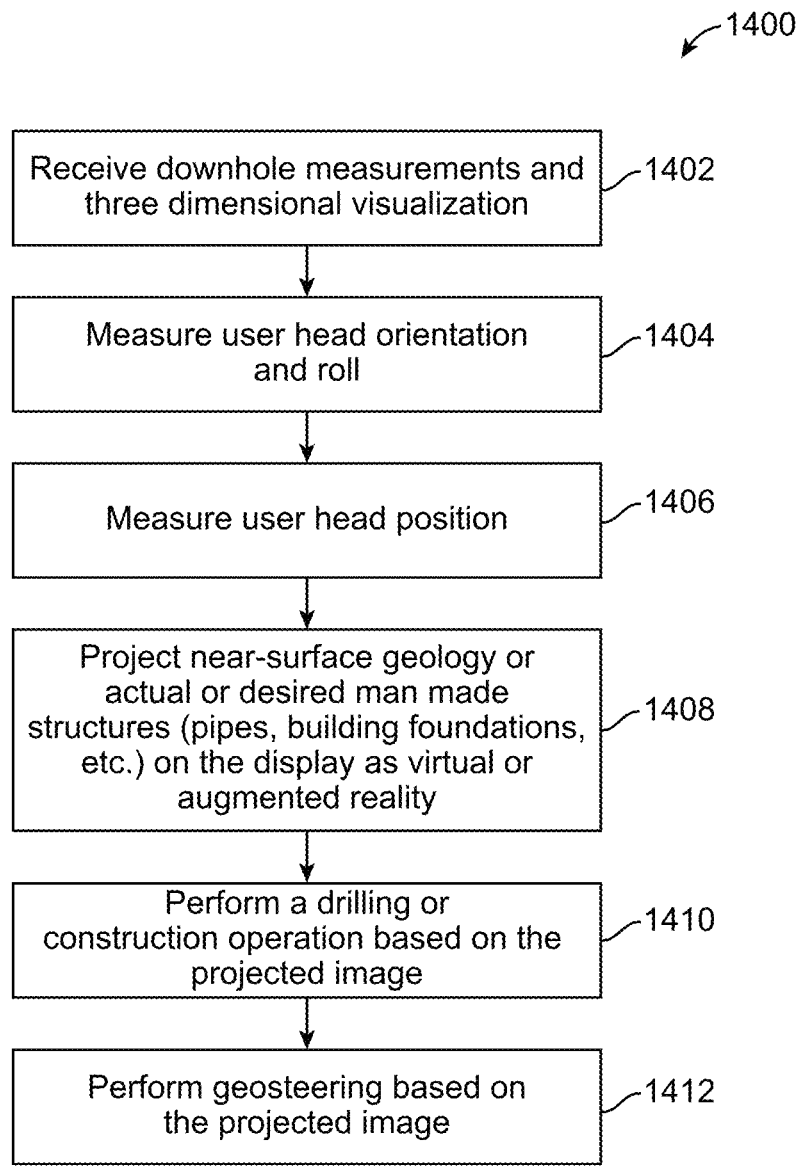
FIG. 14 is a flow chart of an interactive three dimensional virtual reality system having an augmented reality for a drilling operation.

FIG. 14 illustrates an example method 1400 for using an interactive virtual reality apparatus 100 for shallow drilling operation, in some instances steam assisted gravity drainage (SAGD). The method 1400 can be a specific iteration of method 800 described above with respect to FIG. 8. Referring to FIG. 14, a flowchart is presented in accordance with an example embodiment. The example method 1400 is provided by way of example, as there are a variety of ways to carry out the method 1400. The method 1400 described below can be carried out using the configurations illustrated in FIGS. 1-8, for example, and various elements of these figures are referenced in explaining example method 1400. Each block shown in FIG. 14 represents one or more processes, methods or subroutines, carried out in the example method 1400. Furthermore, the illustrated order of blocks is illustrative only and the order of the blocks can change according to the present disclosure. Additional blocks may be added or fewer blocks may be utilized, without departing from this disclosure. The example method 1400 can begin at block 1402.

At block 1402, a downhole measurement can be received and a three dimensional visualization formed thereof. The downhole measurement can collect information on near surface geology and man-made structures, for example, pipes, building foundations, etc. and overlaid on with a view of a drilling site.

At block 1404, the stereographic display device can measure a user's head orientation and/or roll. The stereographic display device can include the gesture control device through the implementation of one or more accelerometers, gyroscopes, or other related sensors.

At block 1406, the stereographic display device can measure a user's head position. The user's starting head position and orientation can set as an initial position to determine movement and position relative thereto for use as a gesture control device.

At block 1408, project near surface geology, actual or desired man-made structures on the stereographic display device generating a virtual or augmented reality. Movement of the user's head adjusts in real-time the overlaid image of the downhole measurements along with the drilling site providing an augmented reality.

At block 1410, a drilling or construction operation can be performed based on the projected image.

At block 1412, geosteering can be performed based on the projected image.

Figure 15A:
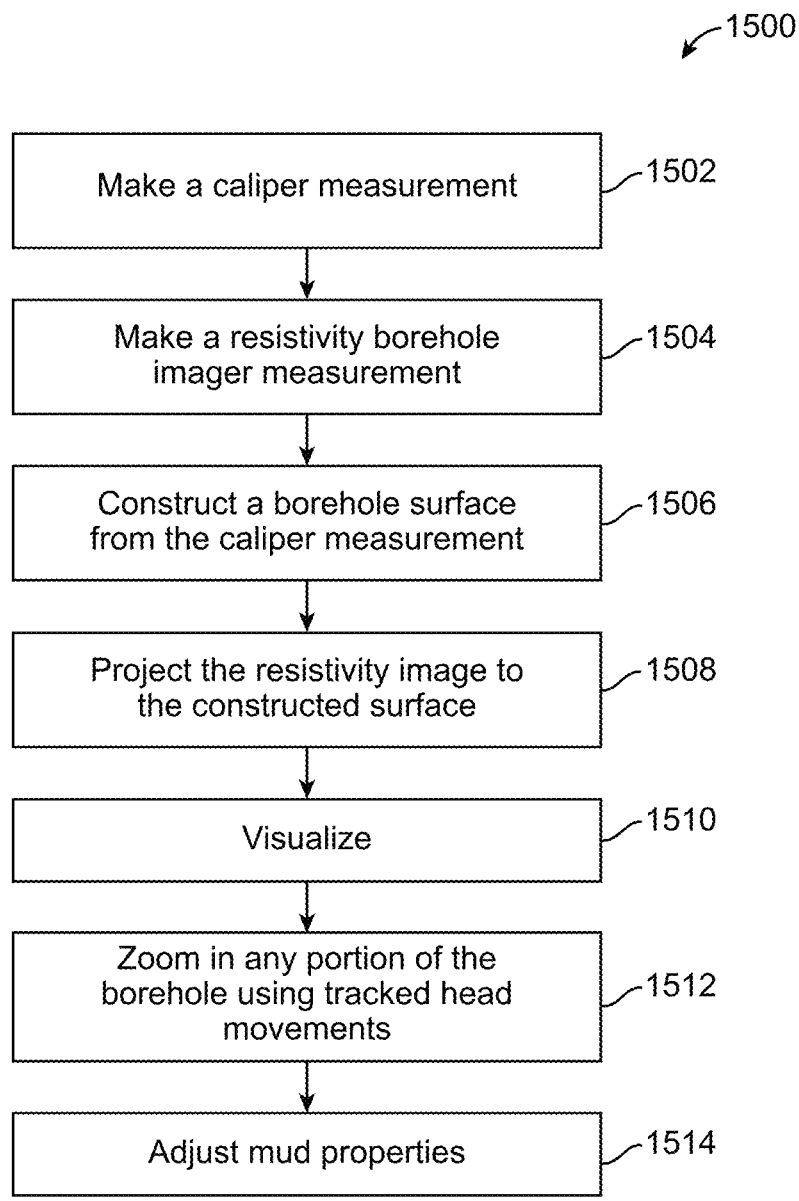
FIG. 15A is a flow chart of an interactive three dimensional virtual reality system for adjusting mud type.

FIG. 15A illustrates an example method 1500 for using an interactive virtual reality apparatus 100 for caliper measurements. The method 1500 can be a specific iteration of method 800 described above with respect to FIG. 8. Referring to FIG. 15A, a flowchart is presented in accordance with an example embodiment. The example method 1500 is provided by way of example, as there are a variety of ways to carry out the method 1500. The method 1500 described below can be carried out using the configurations illustrated in FIGS. 1-8, for example, and various elements of these figures are referenced in explaining example method 1500. Each block shown in FIG. 15A represents one or more processes, methods or subroutines, carried out in the example method 1500. Furthermore, the illustrated order of blocks is illustrative only and the order of the blocks can change according to the present disclosure. Additional blocks may be added or fewer blocks may be utilized, without departing from this disclosure. The example method 1500 can begin at block 1502.

At block 1502, a caliper measurement is made to construct a three dimensional virtual surface representation a borehole wall. During drilling operations, a drill bit is regularly removed replaced during a 'bit trip' in which the drill string is removed from the wellbore. A wireline tool string can be lowered into the borehole for measurements including a caliper measurement.

At block, 1504, a borehole resistivity imager can provide a shallow resistivity map of the borehole wall.

At block 1506, a borehole surface is constructed from the caliper measurement.

At block 1508, the resistivity map is projected on to the constructed surface.

At block 1510, the projection is visualized by a user via a stereographic display device.

At block 1512, the user can control the visualization via the gesture control device including head movements. The user can zoom in on portions of the three dimensional visualization to determine conditions within the wellbore and whether the appropriate drilling mud is being utilized. Problems such as over-invasion and/or washout can be diagnosed and mud properties adjusted appropriately.

At block 1514, the mud properties can be adjusted to correct the diagnosed problems within the wellbore.

Figure 15B:
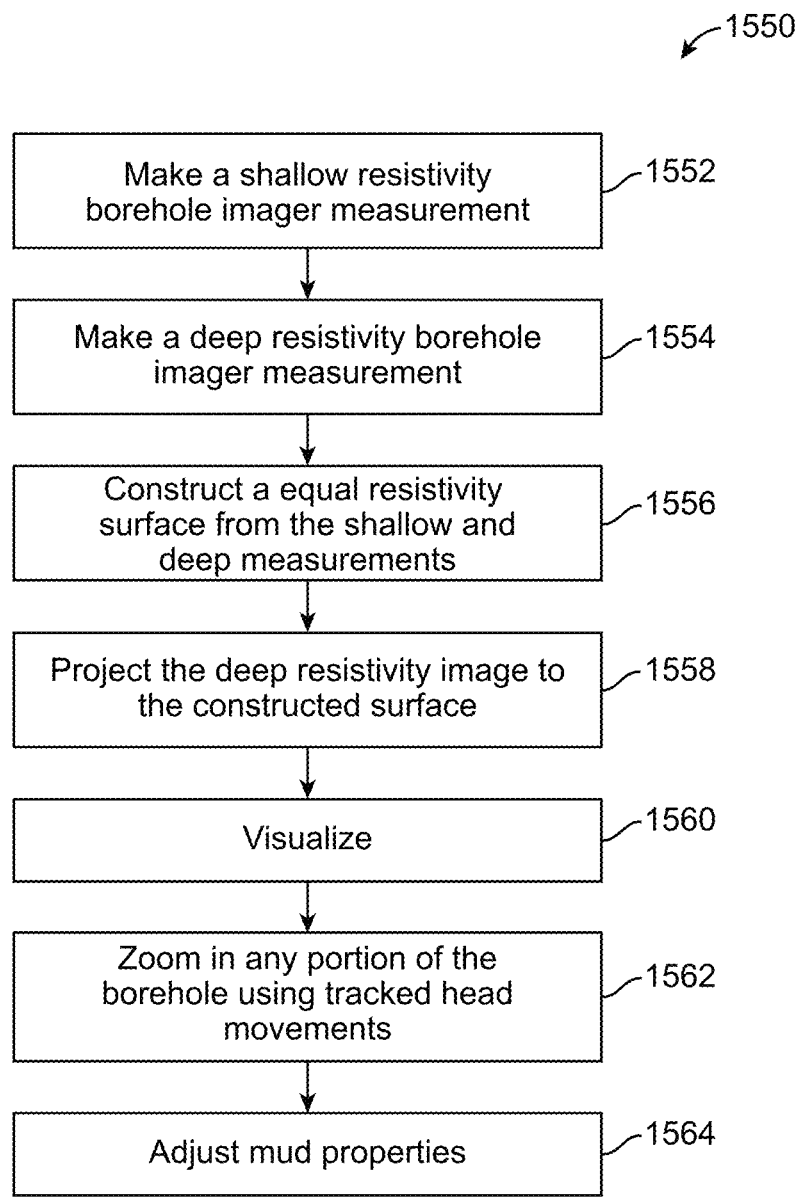
FIG. 15B is a flow chart of a second an interactive three dimensional virtual reality system for adjusting mud type.

FIG. 15B illustrates an example method 1550 for using an interactive virtual reality apparatus 100 for caliper measurements. The method 1550 can be a specific iteration of method 800 described above with respect to FIG. 8. Referring to FIG. 15B, a flowchart is presented in accordance with an example embodiment. The example method 1550 is provided by way of example, as there are a variety of ways to carry out the method 1550. The method 1550 described below can be carried out using the configurations illustrated in FIGS. 1-8, for example, and various elements of these figures are referenced in explaining example method 1550. Each block shown in FIG. 15B represents one or more processes, methods or subroutines, carried out in the example method 1550. Furthermore, the illustrated order of blocks is illustrative only and the order of the blocks can change according to the present disclosure. Additional blocks may be added or fewer blocks may be utilized, without departing from this disclosure. The example method 1550 can begin at block 1552.

At block 1502, a borehole imager can provide a shallow resistivity map of the borehole wall. During drilling operations, a drill bit is regularly removed replaced during a 'bit trip' in which the drill string is removed from the wellbore. A wireline tool string can be lowered into the borehole for measurements including a borehole imager.

At block, 1554, the borehole resistivity imager can provide a deep resistivity map of the borehole wall.

At block 1556, an equal resistivity borehole surface is constructed from the shallow and deep measurements.

At block 1558, the deep resistivity image is projected on to the constructed surface.

At block 1560, the projection is visualized by a user via a stereographic display device.

At block 1562, the user can control the visualization via the gesture control device including head movements. The shape and resistivity of the constructed surface can yield information on the condition of the borehole. The user can zoom in on portions of the three dimensional visualization to determine conditions within the wellbore and whether the appropriate drilling mud is being utilized. Problems such as over-invasion and/or washout can be diagnosed and mud properties adjusted appropriately.

At block 1564, the mud properties can be adjusted to correct the diagnosed problems within the wellbore.

Figure 16:
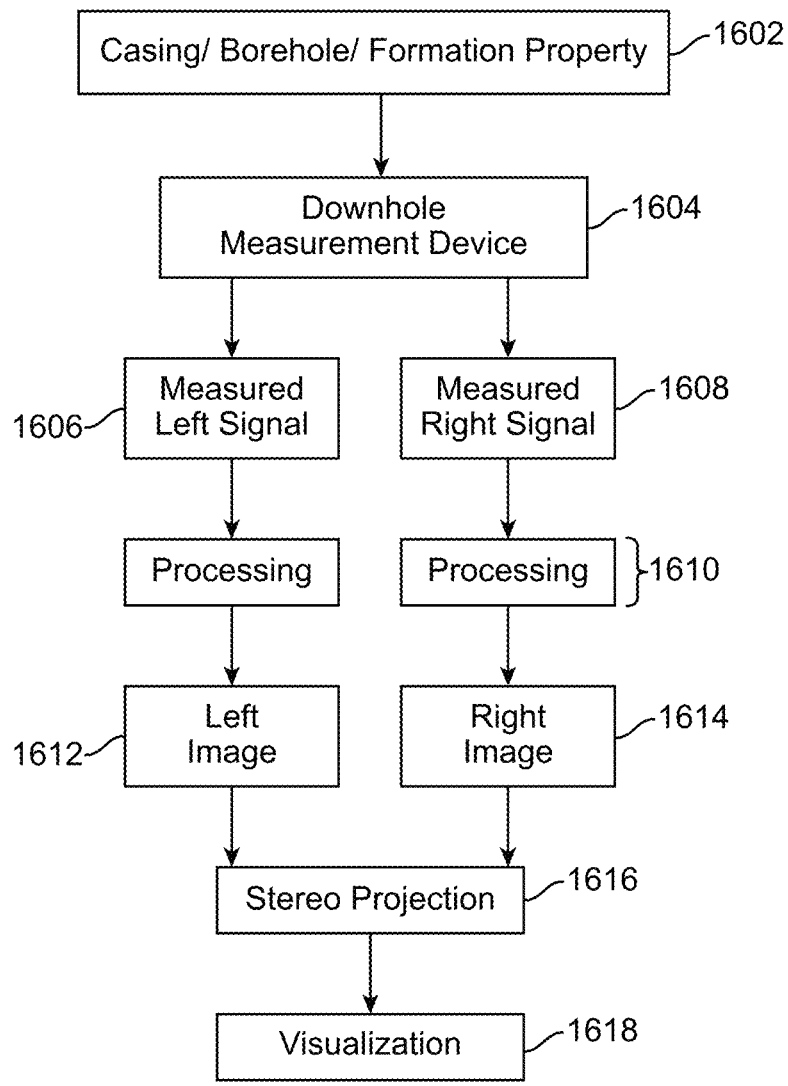
FIG. 16 is a flow chart of an interactive three dimensional virtual reality system for a downhole measurement operation.

FIG. 16 illustrates an example method 1600 for using an interactive virtual reality apparatus 100 to generate a false three dimensional view. The method 1600 can generate a false three dimensional visualization using the stereographic display device to overlay two images of the same feature, thereby "tricking" a user's brain to detect any difference between the two images as depth. If the two images are identical, the depth dimension appears to be at infinity (or very far away). The more differences within the two images, the closer the three dimensional visualization is perceived. The two images can be compared by projecting one of the left eye and the other on the right eye of the stereographic display device and interpreting the depth perception resulting from their difference. In some instances, the two images can be generated by different measurement devices within a wellbore. In other instances, the two images can be generated by the same measurement device at different times, sensitivities, and/or sampling rates, etc.

Referring to FIG. 16, a flowchart is presented in accordance with an example embodiment. The example method 1600 is provided by way of example, as there are a variety of ways to carry out the method 1600. The method 1600 described below can be carried out using the configurations illustrated in FIGS. 1-7, for example, and various elements of these figures are referenced in explaining example method 1600. Each block shown in FIG. 16 represents one or more processes, methods or subroutines, carried out in the example method 1600. Furthermore, the illustrated order of blocks is illustrative only and the order of the blocks can change according to the present disclosure. Additional blocks may be added or fewer blocks may be utilized, without departing from this disclosure. The example method 1600 can begin at block 1602.

At block 1602, a casing, borehole, or formation property is presented.

At block 1604, a downhole measurement device is disposed within the wellbore to measure the casing, borehole, or formation property. In some instances, more than one downhole measurement device can be disposed within the wellbore to measure the casing, borehole, and/or formation property.

At block 1606, a first measured signal can be generated by the downhole measurement device and associated as the left signal.

At block 1608, a second measured signal can be generated by the downhole measurement device and associated as the right signal. In some instances, the second measured signal can be generated using the downhole measurement device used to generate the first measured signal. In other instances, a different downhole measurement device can be used to generate the second measured signal.

At block 1610, the first measured signal and the second measured signal can be processed. Processing can require normalizing and otherwise processing the measured signal.

At block 1612, the first measured signal is normalized and processed to generate a first image, or left image.

At block 1614, the second measured signal is normalized and processed to generate a second image, or right image.

At block 1616, the first image and second image can be displayed by the stereographic display device as a stereo projection.

At block 1618, the stereo projection can form a visualization. The visualization, when viewed by a user, can generate a three dimensional image as the user's brain detects differences between the first image and the second image as depth, thereby forming a three dimensional virtualization. In some instances, the user can manipulate the three dimensional visualization using a gesture control device.

FIG. 17A illustrates an example method 1700 for using an interactive virtual reality apparatus 100 for downhole measurements. The method 1700 can be a specific iteration of method 1600 described above with respect to FIG. 16. Referring to FIG. 17A, a flowchart is presented in accordance with an example embodiment. The example method 1700 is provided by way of example, as there are a variety of ways to carry out the method 1700. The method 1700 described below can be carried out using the configurations illustrated in FIGS. 1-7, for example, and various elements of these figures are referenced in explaining example method 1700. Each block shown in FIG. 17A represents one or more processes, methods or subroutines, carried out in the example method 1700. Furthermore, the illustrated order of blocks is illustrative only and the order of the blocks can change according to the present disclosure. Additional blocks may be added or fewer blocks may be utilized, without departing from this disclosure. The example method 1700 can begin at block 1702.

At block 1702, a downhole measurement device generates a casing, borehole, and/or formation property measurement.

At block 1704, a downhole measurement device generates a repeated casing, borehole, and/or formation property measurement. In some instances, the downhole measurement device repeats the measurement without any change to the logging parameters. In other instances, a different downhole measurement device is used and/or different logging parameters are implemented.

At block 1706, the stereographic display device projects the first measurement to the left eye.

At block 1708, the stereographic display device projects the repeated measurement to the right eye.

At block 1710, a visualization is formed by a user viewing the first measurement in the left eye and the repeated measurement in the right eye, thereby forming a three dimensional visualization.

At block 1712, the stereographic display device presenting the first measurement to the left eye and the repeated measurement to the right eye causes the user's brain to view difference between the first measurement and the repeated measurement as depth, thereby forming a three dimensional virtualization. In some instances, the user can manipulate the three dimensional visualization using a gesture control device.

FIG. 17B illustrates an example first measurement 1752 and an example repeated measurement 1754. The measurements 1750 can be presented to a user via the stereographic display device allowing the user to determine difference between the first measurement 1752 and the repeated measurement 1754. The first measurement 1752 can be taken with a downhole tool, and the repeated measurement 1754 can be taken with the downhole tool at a different time or with different measurement parameters.

FIG. 18A illustrates an example method 1800 for using an interactive virtual reality apparatus 100 for downhole measurements. The method 1800 can be a specific iteration of method 1600 described above with respect to FIG. 16. Referring to FIG. 18A, a flowchart is presented in accordance with an example embodiment. The example method 1800 is provided by way of example, as there are a variety of ways to carry out the method 1800. The method 1800 described below can be carried out using the configurations illustrated in FIGS. 1-7, for example, and various elements of these figures are referenced in explaining example method 1800. Each block shown in FIG. 18A represents one or more processes, methods or subroutines, carried out in the example method 1800. Furthermore, the illustrated order of blocks is illustrative only and the order of the blocks can change according to the present disclosure. Additional blocks may be added or fewer blocks may be utilized, without departing from this disclosure. The example method 1800 can begin at block 1802.

At block 1802, a downhole measurement device generates a casing, borehole, and/or formation property measurement.

At block 1804, a second downhole measurement device generates a second casing, borehole, and/or formation property measurement. The second downhole measurement device can take a measurement using different physics from the downhole measurement device and/or different logging parameters.

At block 1806, the stereographic display device projects the first measurement to the left eye.

At block 1808, the stereographic display device projects the second measurement to the right eye.

At block 1810, a visualization is formed by a user viewing the first measurement in the left eye and the second measurement in the right eye, thereby forming a three dimensional visualization.

At block 1812, the stereographic display device presenting the first measurement to the left eye and the second measurement to the right eye causes the user's brain to view difference between the first measurement and the second measurement as depth, thereby forming a three dimensional virtualization. In some instances, the user can manipulate the three dimensional visualization using a gesture control device.

FIG. 18B illustrates an example first measurement 1852 and an example second measurement 1854. The measurements 1850 can be presented to a user via the stereographic display device allowing the user to determine difference between the first measurement 1852 and the second measurement 1854. The first measurement 1852 can be taken with a downhole tool, and the repeated measurement 1854 can be taken with a second downhole tool operating under a different measurement technique. In some instances, the downhole tool can provide a shallow resistivity map of the borehole wall while the second downhole tool can provide an acoustic slowness map of the borehole wall. These two downhole measurements can be substantially normalized and/or color matched to allow a user to perceive differences between them as depth.

The present disclosure is suited for use in any drilling operation that generates a subterranean borehole. For example, the present disclosure is suited to drilling for hydrocarbon or mineral exploration, environmental investigations, natural gas extraction, underground installation, mining operations, water wells, geothermal wells, and the like.

STATEMENT OF CLAIMS

Statement 1: A method for visualization and manipulation of downhole data, comprising: receiving a measured signal of a downhole environment; generating a three dimensional virtualization of the measured signal; displaying, on a stereographic viewer, the three dimensional virtualization of the measured signal; manipulating the three dimensional virtualization in response to an input from a user, thereby creating a manipulated three dimensional virtualization; and displaying, on the stereographic viewer, the manipulated three dimensional virtualization.

Statement 2: The method of Statement 1, further comprising adjusting a well bore operation based on the manipulated three dimension virtualization.

Statement 3: The method according to one of Statement 1 or Statement 2, wherein the measured signal is one of a well-logging, casing inspection, permanent reservoir monitoring, or a measurement while drilling (MWD) operation.

Statement 4: The method according to any one of the preceding Statements 1-3, wherein the stereo graphic viewer includes a head tracking system and the head tracking system generates the input.

Statement 5: The method according to any one of the preceding Statements 1-4, wherein the head tracking system has at least one of a gyroscope, an accelerometer, or image processing.

Statement 6: The method according to any one of the preceding Statements 1-5, wherein input is received from a gesture control device or a head tracking system.

Statement 7: The method according to any one of the preceding Statements 1-6, wherein the input is received by one or more virtual buttons configured to manipulate the three dimensional virtualization.

Statement 8: The method according to any one of the preceding Statements 1-7, wherein the one or more virtual buttons include at least one of scroll bars, dropdown menus, or checkboxes.

Statement 9: The method according to any one of the preceding Statements 1-8, further comprising determining at least one parameter of a well-logging, casing inspection, or drilling operation in response to the input from a user.

Statement 10: The method according to Statement 9, wherein determining the at least one parameter of a well-logging or casing inspection operation is specifying the settings of the next logging run or pass.

Statement 11: The method according to one of Statement 9 or Statement 10, wherein determining the at least one parameter of a drilling operation is geosteering.

Statement 12: The method according to any one of Statements 9-11, wherein determining the at least one parameter of a drilling operation is appropriate drilling mud properties.

Statement 13: The method any one of the preceding Statements 1-12, further comprising modifying at least one production parameter in response to the input from a user.

Statement 14: The method of Statement 13, wherein modifying the at least one production parameter is one of opening a valve on a production well, closing a valve on a production well, or changing hydraulic fracturing parameters.

Statement 15: A system for visualization and manipulation of downhole data, comprising: an interactive virtual reality apparatus having a stereographic display device and a gesture control device; an electronic device communicatively coupled with the interactive virtual reality apparatus, the electronic device having a processor and a memory, the memory storing instructions, which when executed cause the processor to: receive a measured signal of a downhole environment; generate a three dimensional virtualization of the measured signal; communicate the three dimensional virtualization to the interactive virtual reality apparatus; manipulate the three dimensional virtualization in response to an input from the interactive virtual reality apparatus, thereby creating a manipulated three dimensional virtualization; and communicate the manipulated three dimensional virtualization to the interactive virtual reality apparatus.

Statement 16: The system of Statement 15, further comprising the memory storing instructions, which when executed cause the processor to adjust a well bore operation based on the manipulated three dimension virtualization.

Statement 17: The system according Statement 15 or Statement 16, wherein the gesture control device is a head tracking system communicatively coupled with the stereographic display device.

Statement 18: The system according any one of the preceding Statements 15-17, wherein the gesture control device is configured to be coupled with at least one extremity of a user, the gesture control device having one or more sensors tracking movement of the at least one extremity.

Statement 19: A computer-readable storage device having instructions stored which, when executed by a computing device, cause the computing device to perform operations comprising: receiving a measured signal of a downhole environment; generating a three dimensional virtualization of the measured signal; communicating the three dimensional virtualization to an interactive virtual reality apparatus; manipulating the three dimensional virtualization in response to an input from the interactive virtual reality apparatus, to yield a manipulated three dimensional virtualization, thereby creating a manipulated three dimensional virtualization; and communicating the manipulated three dimensional virtualization to the interactive virtual reality apparatus.

Statement 20: The system of Statement 19, further comprising the memory storing instructions, which when executed cause the processor to adjusting a well bore operation based on the manipulated three dimension virtualization.

Statement 21: The system of Statement 19 or Statement 20, wherein the gesture control device is a head tracking system communicatively coupled with the stereographic display device.

Statement 22: The system according any one of the preceding Statements 18-21, wherein the gesture control device is configured to be coupled with at least one extremity of a user, the gesture control device having one or more sensors tacking movement of the at least one extremity.

Statement 23: A method for visualization of downhole data, comprising:

receiving a left measured signal of a downhole environment and a right measured signal of the downhole environment, processing the left measured signal to generate a left image and the right measured signal to generate a right image, displaying, on a stereographic viewer, the left image to a user's left eye and the right image to a user's right eye, thereby forming a three dimensional virtualization, and wherein variation between the left measured signal and the second measured signal is perceived as three dimensional depth changes in the three dimensional virtualization.

Statement 24: The method according to Statement 23, wherein the left measured signal has a first set of logging parameters and the right measured signal has a second set of logging parameters.

Statement 25: The method according to Statement 23 or Statement 24, wherein the left measured signal is based on a first physics and the second measured signal is based on a second physics.

Statement 26: A method for visualization and manipulation of downhole data, comprising receiving a measured signal of a downhole environment, displaying, on a stereographic viewer, a three dimensional virtualization based on the measured signal, manipulating the three dimensional virtualization in response to an input from a user, thereby creating a manipulated three dimensional virtualization, and displaying, on the stereographic viewer, the manipulated three dimensional virtualization.

Statement 27: The method according to Statement 26, further comprising generating a three dimensional model based on the measured signal, and displaying, on the stereographic viewer, the three dimensional virtualization based on the three dimensional model.

Statement 28: The method according to Statement 26 or Statement 27, wherein displaying the three dimensional virtualization based on the measured signal comprises displaying, on the stereographic viewer, a left image to a user's left eye and a right image to a user's right eye, wherein at least one or both of the left image and the right image is based on the measured signal.

Statement 29: The method of according to Statement 28, generating three dimensional depth changes in the three dimensional virtualization due to a variation between the left image and the right image.

Statement 30: The method according to Statement 28, further comprising receiving a left measured signal of a downhole environment and a right measured signal of the downhole environment, and displaying, on the stereographic viewer, the left image based on the left measured signal, and the right image based on the right measured signal.

Statement 31: The method according to Statement 30, wherein the left measured signal is based on a first physics and the second measured signal is based on a second physics.

Statement 32: The method according to any one of Statements 28-31, wherein the measured signal of a downhole environment is at least one or more of a formation property, a casing property, casing defect, temperature, pressure, chemical composition, distance to water/$CO_2$, distance to a bed boundary (DTBB), caliper measurement, resistivity, steam assisted gravity drainage, near surface geology, and man-made structures.

Statement 33: The method according to any one of Statements 28-32, wherein the displayed three dimensional virtualization is a colored iso-parameter surfaces and/or colored volumetric fog of a borehole or casing.

Statement 34: The method according to any one of Statements 28-33, wherein input is received from a gesture control device or a head tracking system.

Statement 35: The method according to Statement 34, wherein manipulating the three dimensional virtualization comprises smoothing virtualized surfaces.

Statement 36: The method according to Statement 34, further comprising determining at least one parameter of a well-logging, casing inspection, or drilling operation in response to the input from a user.

Statement 37: The method according to Statement 34, wherein determining the at least one parameter of a well-logging or casing inspection operation is one of specifying the settings of the next logging run or geo steering.

What is claimed is:

1. A system for visualization and manipulation of downhole data, comprising:
    an interactive virtual reality apparatus having a stereographic display device and a gesture control device;
    an electronic device communicatively coupled with the interactive virtual reality apparatus, the electronic device having a processor and a memory, the memory storing instructions, which when executed cause the processor to:
        receive a measured signal of a downhole environment representing a plurality of formation properties;
        generate a three dimensional virtualization of the measured signal, wherein each formation property is represented by a different colored iso-parameter surface;
        communicate the three dimensional virtualization to the interactive virtual reality apparatus;
        manipulate the three dimensional virtualization in response to an input from the interactive virtual reality apparatus, thereby creating a manipulated three dimensional virtualization, wherein the three dimensional virtualization is manipulated by hiding a colored iso-parameter surface representing one formation property of the plurality of formation properties from the three dimensional visualization; and
        communicate the manipulated three dimensional virtualization to the interactive virtual reality apparatus.

2. The system of claim 1, wherein the interactive virtual reality apparatus displays the three dimensional virtualization based on the measured signal by:
    displaying, on a stereographic viewer, a left image to a user's left eye and a right image to a user's right eye, wherein at least one or both of the left image and the right image is based on the measured signal.

3. The system of claim 2, wherein the stereographic viewer generates three dimensional depth changes in the three dimensional virtualization due to a variation between the left image and the right image.

4. The system of claim 2, wherein the stereographic viewer receives a left measured signal of the downhole environment and a right measured signal of the downhole environment and displays the left image based on the left measured signal and the right image based on the right measured signal.

5. The system of claim 4, wherein the left measured signal is based on a first physics and the right measured signal is based on a second physics.

6. The system of claim 1, wherein the measured signal of the downhole environment is at least one or more of a formation property, a casing property, casing defect, temperature, pressure, chemical composition, distance to water/$CO_2$, distance to a bed boundary (DTBB), caliper measurement, resistivity, steam assisted gravity drainage, near surface geology, and man-made structures.

7. The system of claim 1, wherein the instructions cause the processor to manipulate the three dimensional virtualization by smoothing virtualized surfaces.

8. The system of claim 1, wherein the instructions cause the processor to determine at least one parameter of a well-logging, casing inspection, or drilling operation in response to the input from a user.

9. The system of claim 1, further comprising the memory storing instructions, which when executed cause the processor to adjust a well bore operation based on the manipulated three dimension virtualization.

10. The system of claim 1, wherein the gesture control device is a head tracking system communicatively coupled with the stereographic display device.

11. The system of claim 1, wherein the gesture control device is configured to be coupled with at least one extremity of a user, the gesture control device having one or more sensors tracking movement of the at least one extremity.

12. The system of claim 1, wherein the manipulated three dimensional visualization includes at least one control for modifying at least one parameter of production for a well monitoring system, and wherein the at least one parameter of production comprises valve opening or shut-off.

13. The system of claim 1, wherein the manipulated three dimensional visualization includes at least one control for modifying at least one parameter of production for a well monitoring system, and wherein the at least one parameter of production comprises hydraulic fracturing parameters.

14. The system of claim 1, wherein the manipulated three dimensional visualization includes at least one control for modifying at least one parameter of production for a well monitoring system, and wherein the at least one parameter of production comprises production zone production parameters.

* * * * *